US011954208B1

(12) United States Patent
Grass et al.

(10) Patent No.: US 11,954,208 B1
(45) Date of Patent: Apr. 9, 2024

(54) SYSTEM SECURITY EVALUATION MODEL

(71) Applicant: BAE Systems Information and Electronic Systems Integration Inc., Nashua, NH (US)

(72) Inventors: Sheldon L. Grass, Chester, NH (US); Alfreda M. DeLong, Billerica, MA (US); Jonathan P Ingraham, Pelham, NH (US); Noel A. Zenga, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 746 days.

(21) Appl. No.: 17/103,131

(22) Filed: Nov. 24, 2020

(51) Int. Cl.
*G06F 21/57* (2013.01)
*G06F 9/4401* (2018.01)
*G06Q 10/0635* (2023.01)
*G06Q 10/0637* (2023.01)
*G06Q 10/0639* (2023.01)
*G06Q 10/067* (2023.01)
*G06Q 10/0875* (2023.01)
*G06Q 10/101* (2023.01)

(52) U.S. Cl.
CPC .......... *G06F 21/577* (2013.01); *G06F 9/4401* (2013.01); *G06Q 10/0635* (2013.01); *G06Q 10/06375* (2013.01); *G06Q 10/06393* (2013.01); *G06Q 10/06395* (2013.01); *G06Q 10/067* (2013.01); *G06Q 10/0875* (2013.01); *G06Q 10/101* (2013.01); *G06F 2221/034* (2013.01); *G06Q 2220/00* (2013.01)

(58) Field of Classification Search
CPC ................. G06F 21/577; G06F 9/4401; G06F 2221/034; G06Q 10/0635; G06Q 10/06375; G06Q 10/06393; G06Q 10/06395; G06Q 10/067; G06Q 10/0875; G06Q 10/101; G06Q 2220/00
See application file for complete search history.

(56) References Cited

U.S. PATENT DOCUMENTS

| 9,699,208 B1 * | 7/2017 | Francoeur | H04L 63/1433 |
| 10,318,740 B2 * | 6/2019 | Toledano | H04L 63/06 |
| 11,170,334 B1 * | 11/2021 | Orzechowski | G06N 20/00 |
| 11,409,887 B2 * | 8/2022 | Gourisetti | G06F 21/577 |

(Continued)

*Primary Examiner* — Kambiz Zand
*Assistant Examiner* — Afaq Ali
(74) *Attorney, Agent, or Firm* — Maine Cernota & Curran; Gary McFaline

(57) ABSTRACT

A method for a system for security evaluation includes working one state at a time; identifying primitives of interest and systematically applying relevant attacks for the system; starting at chip level, working through states, and then expanding a system boundary and repeating; following a sequence of: chip>circuit card>subsystem>system>platform for a product solution under analysis; determining if a system definition has sufficient detail, or is too abstract; for a chip with a native secure boot protocol, determining if all players are represented; representing attacks as vectors made up of measurements of the following attributes: Dollars, days, Probability of success, Probability of destruction, technology node, and number of samples; and representing countermeasures as vectors made up of scaling factors for each of attack attributes.

19 Claims, 15 Drawing Sheets

(56) References Cited

U.S. PATENT DOCUMENTS

| | | | | |
|---|---|---|---|---|
| 2007/0288765 | A1* | 12/2007 | Kean | G06F 21/76 |
| | | | | 713/193 |
| 2017/0176530 | A1* | 6/2017 | Cottrell | G01R 31/31719 |
| 2017/0244740 | A1* | 8/2017 | Mahabir | H04L 63/1433 |
| 2020/0342112 | A1* | 10/2020 | Plusquellic | G06F 21/602 |
| 2021/0124711 | A1* | 4/2021 | Ansari | G06F 1/26 |
| 2022/0019676 | A1* | 1/2022 | Guo | G06F 18/24 |

* cited by examiner 100
110
AUTOMOTIVE
115
AEROSPACE
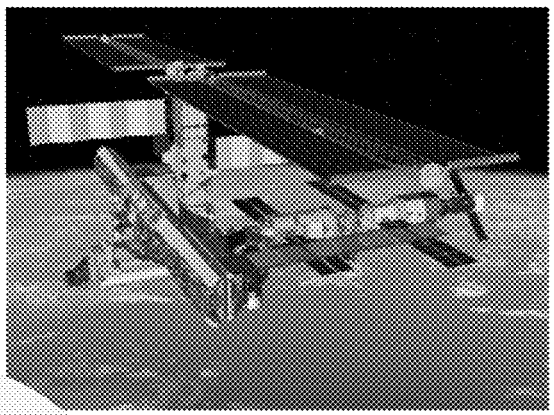
105
NAVAL
SYSTEM
SECURITY
ENVIRONMENTS
120
COMMERCIAL/IOT
ENVIRONMENTS
FIG. 1

SECURITY DATA INPUTS AND OUTPUTS

FRAMEWORK OVERVIEW

400
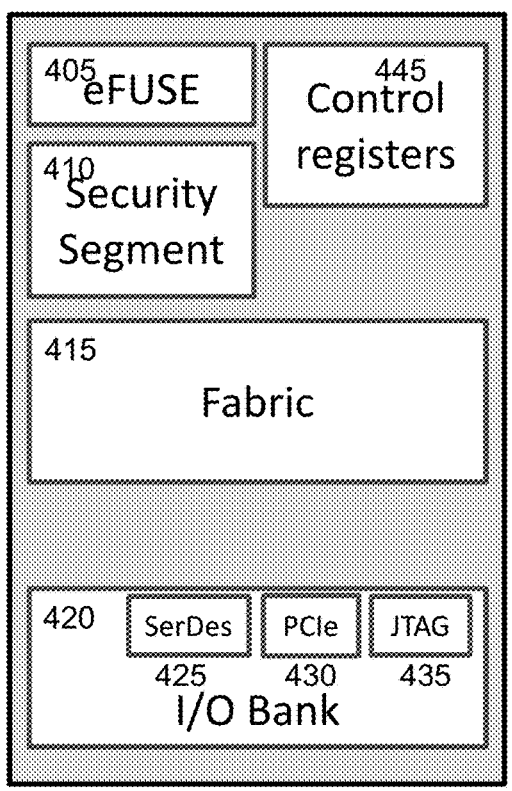
450
| FPGA Element | Primitive Category |
|---|---|
| Bitstream | Memory (NVM) |
| I/O Bank | External Port |
| SerDes | External Interface |
| JTAG | External Port |
| PCIe | External Interface |
| eFUSE | Keystore |
| Control register | Control Register |
| Fabric | Processing |
| Security Segment | Processing |
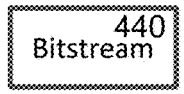
FPGA REPRESENTATION WITH PRIMITIVES
FIG. 4

500

| FPGA Element | Primitive Category | At Rest | Initialization | Run Time | Return to Rest |
|---|---|---|---|---|---|
| 505 Bitstream | Memory (NVM) | X | X | | |
| 510 I/O Bank | External Port | | X | X | |
| 515 SerDes | External Interface | | | X | |
| 520 JTAG | External Port | | X | X | |
| 525 PCIe | External Interface | | | X | |
| 530 eFUSE | Keystore | X | X | | |
| 535 Control register | Control Register | X | X | | |
| 540 Fabric | Processing | | X | X | X |
| 545 Security Segment | Processing | | X | X | |

FPGA REPRESENTATION WITH SYSTEM STATE
FIG. 5

FPGA REPRESENTATION WITH ATACK ANALYSIS

700

| ID | FPGA Element | Primitive Category | State | Attack | Inter-dependency | Invest-ment ($K) | Dura-tion | P(Suc-cess) | P(Des-truct) | Tech Node | # Samples (K) |
|---|---|---|---|---|---|---|---|---|---|---|---|
| | 705 | 710 | 715 | 720 | 730 | 735 | 740 | 745 | 750 | 755 | 760 |
| 1 | Bitstream | Memory (NVM) | at rest | Read bitstream from external memory | | 1 | 1 | 0.99 | 0.001 | 1 | 1 |
| 2 | JTAG | External Port | run time | Access JTAG | | 1 | 1 | 0.99 | 0.001 | 1 | 1 |
| 3 | Fabric | Processing | run time | Read back configuration | 2 | 1.5 | 2 | 0.9 | 0.001 | 1 | 1 |
| 4 | Bitstream | Memory (NVM) | at rest | Provision with Trojan | | 5 | 5 | 0.9 | 0 | 1 | 1 |
| 5 | Bitstream | Memory (NVM) | run time | Add trojan and replace bitstream | 1 | 1 | 3 | 0.9 | 0 | 1 | 1 |

VULNERABILITY MATRIX
FIG. 7

800

| ID | PGA Element | Primitive Category | State | Attack | Countermeasure | Inter-dependency | Investment ($K) | Duration | P(Success) | P(Destruct) | Node | # Samples (K) | Score w/ CM |
|---|---|---|---|---|---|---|---|---|---|---|---|---|---|
| | 805 | 810 | 815 | 820 | 825 | 830 | 835 | 840 | 845 | 850 | 855 | 860 | 870 |
| 1 | Bitstream | Memory (NVM) | at rest | Read bitstream from external memory | | | 1 | 1 | 0.99 | 0.001 | 1 | 1 | 10111121.22 |
| 2 | JTAG | External Port | run time | Access JTAG | | | 1 | 1 | 0.99 | 0.001 | 1 | 1 | 1.01 |
| 3 | Fabric | Processing | run time | Read back configuration | | 2 | 1.5 | 2 | 0.9 | 0.001 | 1 | 1 | 4.35 |
| 4 | Bitstream | Memory (NVM) | at rest | Provision with Trojan | | | 5 | 5 | 0.9 | 0 | 1 | 1 | 27.78 |
| 5 | Bitstream | Memory (NVM) | run time | Add trojan and replace bitstream | | 1 | 1 | 3 | 0.9 | 0 | 1 | 1 | 10111124.56 |
| 6 | Bitstream | CM | at rest | | Encryption | 1 | 100 | 100 | 0.001 | 1 | 1 | 1 | NA |

VULNERABILITY MATRIX WITH SECURITY SCORE
FIG. 8

SYSTEM HIERARCHY AND POWER ON SEQUENCE

FRAMEWORK DATA ELEMENTS

DESIGN ARTIFACTS AND ACTIVITIES WITH FRAMEWORK APPLICATION

1200

| Rank Scale | Description of Investment |
|---|---|
| 10 | Technology development required |
| 9 | Significant financial investment & Significant execution duration |
| 8 | Significant execution duration & Moderate financial investment |
| 7 | Significant financial investment & Moderate execution duration |
| 6 | Moderate execution duration & Moderate financial investment |
| 5 | Significant execution duration & Low financial investment |
| 4 | Moderate execution duration & Low financial investment |
| 3 | Low execution duration & Significant financial investment |
| 2 | Low execution duration & Moderate financial investment |
| 1 | Widely publicized execution with common resources |

| Qualitative Scale | Description of Effectiveness |
|---|---|
| High | Attack has a very high likelihood of causing permanent damage |
| Medium | Attack is occasionally successful or likely to cause permanent damage in the process |
| Low | Attack is almost always successful |

ALTERNATE SCALES FOR SECURITY SCORE PARAMETERS
FIG. 12

DATA VISUALIZATION SCENARIO 1

DATA VISUALIZATION SCENARIO 2

DATA VISUALIZATION SCENARIO 3

US 11,954,208 B1

SYSTEM SECURITY EVALUATION MODEL

STATEMENT OF GOVERNMENT INTEREST

This invention was created with government support under a classified contract number awarded by a classified agency. The government has certain rights in the invention.

FIELD

The disclosure relates to system security evaluation. More specifically to a device, method and system for a quantitative methodology for calculating the relative risk of a system security architecture.

BACKGROUND

Tampering and cyber-attacks can impact systems from the smallest device to the largest platform. Protection needs to be built-in to designs from the beginning and rigorously evaluated. However, current evaluations of Anti-Tamper or Cyber solutions can be subjective, and often times do not provide system security engineers with the desired actionable information to improve the security of a system. Multiple iterations are required to understand the expectation and make the right tradeoffs to get the design right.

System security evaluation has relevance in a diversity of product environments spanning military vehicles 105, automobiles 110, aerospace 115, and commercial Internet of Things (IoT) products 120. All of these systems contain sensitive information or perform critical functions which if compromised are a security or safety risk, and consumers have security performance expectations for these products. The risk of compromise should be mitigated through the inclusion of system security countermeasures into the product design. For example in the automotive application 110, engineers would define the behaviors, architecture, and requirements for the automobile. System Security specialists would identify attack scenarios and system vulnerabilities with security risks. These can be informed by reported incidents, represent security best practices, or derived from expert knowledge. For the automotive example, a hacker could gain entry via a wireless access point and influence vehicle control systems. The automobile can then be decomposed into the functional sub-systems and down to a representation of the attack surface. Each access point would be systematically analyzed per the process and techniques detailed herein along with the criticality of the impacted function. A factor for determining the criticality is whether the access point can take control of the vehicle movement, which has a safety critical impact, versus control the air conditioning, which is a non-critical system.

Existing evaluation methods rely on Subject Matter Expert (SME) analysis which is subjective and provides no objective measurement of the robustness of a design. It is therefore very difficult to compare various designs or design solutions from multiple engineers, manufacturers, or industries. Until now, there has been no way to numerically rate or score a design to decide what is adequate to meet the security requirements. Current discussions on security robustness consist of Go/NoGo verdicts with respect to meeting security objectives. These assessments can be subjective and challenged by biases and do not provide engineers with quality actionable information. This leads to program execution risk that security design evaluators will determine the proposed system security solution is inadequate. Moving all security evaluations to a defined framework with execution guidelines allows for objective analysis of security solution designs across, programs, manufacturers, or industries.

Current approaches require multiple iterations of design evaluation and design update in an effort to converge on the security evaluator's expectation. Although evaluators do not want to dictate a design, they have a well-defined expectation of design robustness based on their own experience and bias. Design evaluators may also have access to technical information that is not uniformly accessible to the engineering community due to the sensitivity of the information. The engineers that are responsible for creating the design solution operate with limited or missing information. The discrepancy in subject matter knowledge combined with the subjective nature of an evaluation, and the existence of personal bias make it difficult to have a common understanding of adequate security architecture. Evaluators may also support multiple programs or projects, and have limited time to evaluate any single, specific effort. Conversations need to be more effective and deliver higher value for both evaluators and those creating the design.

Security design domain training for teaching security attack/countermeasure analysis is limited and difficult to obtain. Limited resources means many engineers rely on domain experience which takes considerable time to build and can have gaps. Analyses of electronic component security exists, but are not highly publicized or widely distributed. There is a need to transition away from a dependency on information that may never be obtained due to constantly evolving technology, lack of concurrence in the industry community, and sensitivity of information on security solutions.

Current electronic device/system vulnerability and risk analysis relies on attack tree analysis which can vary based on the analyst's experience and expertise. The analysis is subject to personal bias and tends to be solution focused (a preconceived attack vector) as opposed to comprehensive across all solution sets. Vulnerability analysis is counter to the create/construct mentality of most engineers. Attack analysis is time consuming to perform, document, and not consistently used by evaluators. What is sufficient from a security design is difficult to define, particularly when a secure design today may be easily overcome with tomorrow's technology advances. Additionally, pressure to be first to market, or first to field, may result in a conscientious decision to release a product with a partial security design implementation that is not objectively characterized. This presents an undue physical and/or information security risk. At this time there is no way to quantify relative risk of security solutions. Additionally, the system Concept of Operations (CONOPS) are not well captured in attack trees, which may result in an attack vector which is overlooked by engineers and evaluators.

What is needed is a quantitative method for calculating relative security risk of a system architecture that enables a shared objective understanding between the designer and solution assessor. The system security model provides a comprehensive and systematic approach for analyzing attacks, vulnerabilities, and countermeasures which adds value to attack/countermeasure trees by making information easier to use, easier to analyze, more complete, and more uniform, all the while serving as a teaching tool.

SUMMARY

An embodiment provides a system for security evaluation providing a quantitative methodology for calculating a relative risk of a system security architecture, the system comprising a Security Evaluation Framework; the Security Evaluation Framework comprising a System Security Model; the System Security Model configured to receive a Security Report for the system architecture; receive a Vendor Component Errata Report for the system architecture; receive security Design Guidance and expectations for the system architecture; receive a Bill of Materials for the system architecture; output a System Security View for the system architecture; and produce a Security Score relative risk report for the security evaluation of the system security architecture whereby the relative risk of the system security architecture is determined. In embodiments the Security Score comprises a Technical Performance Measure; and a Trade Study Analysis. In other embodiments the system comprises at least one Field Programmable Gate Array (FPGA) chip comprising elements of Programmable logic elements (Fabric); configuration Bitstream; a Designated I/O Pin Bank providing access to the Bitstream; Control Registers to enable or disable device features; designated eFUSE registers comprising security features; and a Security Segment comprising segregated logic blocks for performing cryptographic functions. In subsequent embodiments the FPGA Designated I/O Pin Bank comprises a serializer/reserializer (SerDes) interface; a Peripheral Connector Interface express (PCIe) interface; and a Joint Test Access Group (JTAG) port. For additional embodiments Primitive Categories of the FPGA Elements comprise external interfaces; Memory (NVM); Internal Interfaces; Configuration Registers; Keystore; and Processing. In another embodiment System States comprise At Rest; Initialization; Run Time; and Return to Rest. For a following embodiment a System Model representation of the FPGA comprises a Configuration Cloning attack analysis of an Attack Model comprising reading the Bitstream from external memory; or accessing the JTAG port; and reading back a configuration of the Fabric through the JTAG port. In subsequent embodiments a System Model representation of the FPGA comprises a Trojan attack analysis of an Attack Model comprising reading the Bitstream from external memory; and adding the Trojan and replacing the Bitstream; or provisioning with the Trojan. In additional embodiments a Vulnerability Matrix comprises attributes of FPGA Element; Primitive Category; System State; Attack; Interdependency; Investment; Duration; Probability of Success P(Success); Probability of Destruction P(Destruction); Tech Node, and Number of Samples. In ensuing embodiments a Vulnerability Matrix with a Security Score comprises attributes of FPGA Element; Primitive Category; System State; Attack; Countermeasure; Interdependency; Investment; Duration; Probability of Success P(Success); Probability of Destruction P(Destruction); Tech Node, Number of Samples; and the Security Score with Countermeasures. In included embodiments a hierarchy of the system comprises a Platform; a System; at least one Sub-system; at least one Board A Circuit Card Assembly (CCA); at least one Chip; at least one FPGA. In yet further embodiments power on sequences of the system hierarchy levels comprise for the Platform, At Rest, Power On, Control System (A), System (A), and Running; for the System, At Rest, Sub-system Boot (A), Sub-system Boot (B), and System Running; for the at least one Sub-system, At Rest; Board Boot (A), Board Boot (B), and Run; for the at least one Board A Circuit Card Assembly (CCA), At Rest, Power Regulator, Chip (A) Boot, and Chip (B) Boot; for the at least one Chip, At Rest, Initialization, Run, Partial Reconfiguration, and any Design option; for the at least one FPGA, Clear configuration memory, INIT B released, Configuration Mode, Load Bitstream, and Startup sequence. In related embodiments Data Elements of the Framework comprise Common Elements; and Security Engineering Specific Elements; the Common Elements comprising Requirements; fed by Use Cases; Requirements comprising Sub-System Requirements; the Requirements providing input to a System Model, the System Model comprising a Sub-System Model; and Material Lists; the Security Engineering Specific Elements comprising a Hardware Model; an Attack Model; a Countermeasure Model; a Vulnerability Matrix; the Hardware Model, the Attack Model, and the Countermeasure Model providing input to the Vulnerability Matrix; and a Security Score produced from the Vulnerability Matrix; wherein the Sub-System Model and the Material Lists provide input to the Hardware Model. For further embodiments Framework Design Artifacts and Activities comprise a Security Information Module; a System Information Module; a Security Evaluation Plan Module; a Security Analysis Module; and a Security Evaluation Module; the Security Information Module comprising the Security Use Cases, the Attack Model, and the Countermeasure Model; the System Information Module comprising System Context, the System Use Cases, the Requirements, and the Hardware Model; the Security Evaluation Plan Module comprising a Measurement Method and Acceptance Criteria; the Security Analysis Module comprising the System Model, Attack/Countermeasures, Security Attribute Measurement, and the Vulnerability Matrix; the Security Evaluation Module comprising the Security Score, and Acceptable Security Risk; wherein the Security Information Module and the System Information Module provide input to the Security Analysis Module, the Security Analysis Module providing input to the Security Evaluation Module.

Another embodiment provides a method for a system for security evaluation providing a quantitative methodology for calculating a relative risk of a system security architecture comprising a Security Evaluation Framework comprising providing a Security Report for the system architecture; providing a Vendor Component Errata Report for the system architecture; providing security Design Guidance and expectations for the system architecture; providing a Bill of Materials for the system architecture; inputting the Security Report, the Vendor Component Errata Report, the security Design Guidance and expectations, and the Bill of Materials into a Parametric Data System Security Model; outputting a System Security View for the system architecture; and producing a Security Score relative risk report for the security evaluation of the system security architecture whereby the relative risk of the system security architecture is determined. For yet further embodiments the Security Score comprises Security Score Parameters; the Security Score Parameters comprising Security Score Scales; the Security Score Scales comprising Rank Scales with corresponding Descriptions of Investment and Qualitative Scales with corresponding Descriptions of Effectiveness; the Rank Scales comprising: numeric indicators one through ten; the Rank Scale numeric indicators with corresponding Descriptions of Investment are: 10: Technology development required; 9: Significant financial investment and Significant execution duration; 8: Significant execution duration & Moderate financial investment; 7: Significant financial investment & Moderate execution duration; 6: Moderate execution duration & Moderate financial investment; 5: Significant execution duration & Low financial investment; 4: Moderate execution duration & Low financial investment; 3: Low execution duration & Significant financial investment; 2: Low execution duration & Moderate financial investment; 1: Widely publicized execution with common resources; the Qualitative Scales comprising: High, Medium, and Low; the Qualitative Scales with corresponding Descriptions of Effectiveness are High: Attack has a very high likelihood of causing permanent damage; Medium: Attack is occasionally successful or likely to cause permanent damage in the process; and Low: Attack is almost always successful. For more embodiments, the Security Score Sensitive Information (CPI) changes over a product life cycle, steps of the product life cycle comprising, in order: Milestone A (MSA); Request for Proposal (RFP); System Requirements Review (SRR); Preliminary Design Review (PDR); Milestone B (MSB); Critical Design Review (CDR); Milestone C (MSC); Deployed; Repair; and End of Life (EOL). Continued embodiments include Security Risk Level Categories comprising Low Risk, wherein the Security Score is no more than 10% deficient; Medium Risk, wherein the Security Score is greater than 10% but less than 75% deficient; and High Risk, wherein the Security Score is 75% or more deficient; wherein the Security Risk which is calculated as shortcoming deficiency of the Security Score for the System relative to a desired target security performance. For additional embodiments the steps of the product life cycle further comprise steps of Capability Insertion after the step of Deployed; and Second Deploy before the step of Repair; whereby new capability is added, and existing capability is modified.

A yet further embodiment provides a computer program product for calculating a relative risk of a system security architecture including one or more non-transitory machine-readable mediums encoded with instructions that, when executed, cause a process to be carried out, the process comprising inputting a Security Report for the system security architecture; inputting a Vendor Component Errata Report for the system architecture; inputting security Design Guidance and expectations for the system architecture; inputting a Bill of Materials for the system architecture; inputting the Security Report, the Vendor Component Errata Report, the security Design Guidance and expectations, and the Bill of Materials into a Parametric Data System Security Model; outputting a System Security View for the system architecture; and producing a Security Score relative risk report for the security evaluation of the system security architecture whereby the relative risk of the system security architecture is determined.

BRIEF DESCRIPTION OF THE DRAWINGS

FIG. 1 illustrates environments for system security evaluation configured in accordance with an embodiment.

FIG. 4 depicts an exemplar Field Programmable Gate Array (FPGA) in accordance with the framework in accordance with an embodiment.

FIG. 5 depicts the allocation of system state information in accordance with the framework in accordance with an embodiment.

FIG. 7 depicts parameterization of an attack which has been organized into a vulnerability matrix in accordance with an embodiment.

FIG. 8 depicts application of a countermeasure and inclusion of the security score in the vulnerability matrix in accordance with an embodiment.

FIG. 12 depicts an example of a rank order scale and qualitative scale which can be used for security attribute measurement in accordance with an embodiment.

Figure 2:
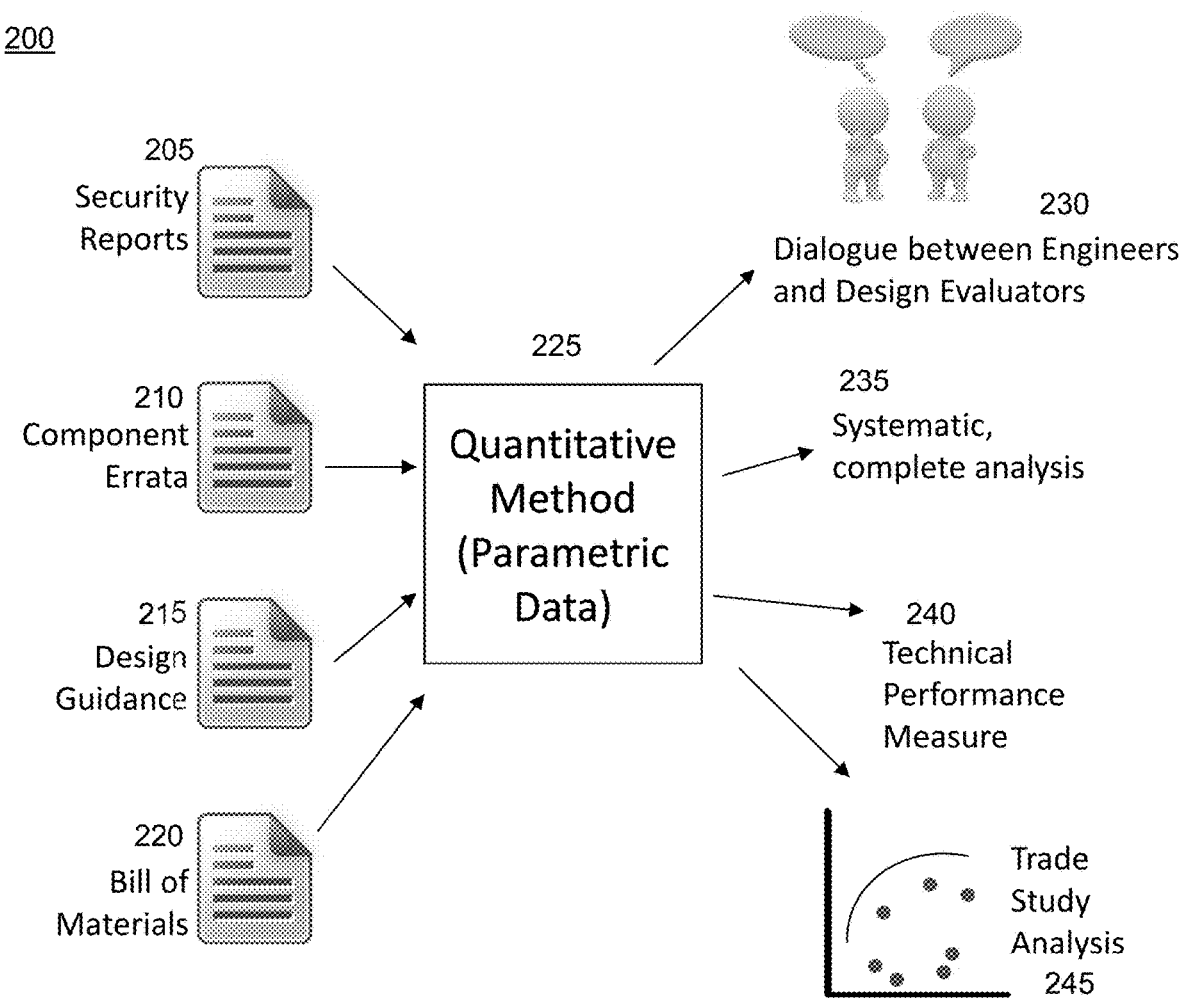
FIG. 2 depicts the security relevant inputs and outputs of the system security evaluation framework in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

The System Security evaluation framework provides a systematic and quantitative method for analyzing and assessing the relative risk of a system security architecture. This enables objective understanding between the evaluator and the engineer on the effectiveness of the design. Providing this quantitative and systematic approach to analyze attacks, vulnerabilities, and countermeasures generates system security analysis which is easier to use, trace, more complete, and uniform. Thus the relative risk of competing security designs can be scored and compared.

Embodiments can be used for Information Assurance, Cyber Security, and Anti-Tamper controls. Additionally, embodiments can be extended to score other subjective designs. Further, embodiments can be put into a Model Based Engineering (MBE) tool to manage associations and perform parametric calculations as part of a larger system model.

Using an objective framework as the basis allows engineers and evaluators to quantify expectations and requirements. Engineers and designers are able to quantify the risk profile and gap analysis such that it is based in more objective terms. The robustness of a security architecture is discussed in terms of measureable attributes as opposed to ambiguous terms like high, medium, and low. Within this framework it is possible to quantify security design expectations and use this as the basis of technical performance measures (TPMs) which enable better risk visibility, risk management, and task tracking for system security engineering.

Organization of the security design information enables traceability from the requirements through the physical and functional representation of the system and to the System Security risk evaluation. This traceability supports impact analysis of design changes and visibility of partially met requirements. The organization of information in the framework enables engineers to associate data from requirements, use cases, and attack vectors to system components, to more objectively determine if the design provides the desired level of security protection. It is possible to analyze the system to determine where weak points are and if the chosen architecture is sufficient to meet the security design objective. Identified security weak points can be analyzed to determine if additional countermeasure(s) (element or system level) or CONOPs changes can sufficiently reduce risk. The security impact of partial implementation and component upgrades can be quickly calculated and more objectively understood. The framework is suitable for simple and highly complex systems. Information can be added as the design evolves or the complexity of the system grows with feedback from the analysis used to inform design decisions.

The security risk analysis identifies potential attack vectors and failure modes which are used to access sensitive information or undermine critical system functions in embodiments. In embodiments context information about possible attack vectors are documented in Security Use Cases which portray the activities of an attacker trying to do harm to the system. Where harm is any action that results in an undesirable effect on the system user. Within the Unified Modeling Language (UML) this information is captured in a bad actor use case. Use cases cover the product life cycle and can be compiled from multiple Subject Matter Experts. In embodiments this collection of information evolves over time and is leveraged by multiple security risk evaluation efforts. An Attack Model is the set of Security Uses Cases describing the interaction of an attacker with the system to extract sensitive information or compromise system performance. Within this framework all attack vectors can be thought of as a variation on or combination of a finite set of fundamental attacks or attack strategies. The Security Use Cases and Attack Model provide a teaching tool capturing the steps or actions, dependencies, and preconditions which make up the context of a cyber or hardware attack. They also provide a means to ensure a diversity of potential attacks are considered in the Security Analysis. The attack vectors identified in the Security Analysis are measured in terms of a specific set of attributes. This information is organized in a vulnerability matrix listing attack vectors and failure modes with associated security attribute measurements which are the parameters for calculating the Security Score. The security risk analysis enables the identification of security weak points in the system and provides a means to objectively determine if the architecture is insufficient to meet the security design objective. System or component level countermeasures can be identified, and the Security Score recalculated to determine if the security risk is reduced to an acceptable level. In embodiments the Security Score is recalculated to objectively understand the security impact of partial implementation and component upgrades.

The framework represents the system under analysis with a model which is capable of defining both small (chip level) and large (system of systems or platform level) systems. The model is combined with quantitative attribute measurements which are the parameters for the quantitative security evaluation. Systems, regardless of the level of complexity, industry, or operating environment, can be decomposed and represented with a model to identify security relevant elements; analyzed for possible security attacks; and measured based on security attributes to calculate a Security Score which represents the relative security risk.

FIG. 1, as mentioned, depicts environments for system security evaluation 100. Environments include ships for naval security and spacecraft for space security 105; automotive 110, aerospace 115, and commercial Internet of Things (IoT) 120. For example, in the automotive application 110, the automotive designers determine the systems security requirements for the vehicle threats such as the various wireless access points into the systems where a hacker would gain entry. Each access point would be analyzed per the processing techniques detailed herein along with the risk parameters such as whether the access point can take control of the vehicle versus only being able to control the air conditioning. Applications for the other environments follow.

FIG. 2 depicts the relationship of information within the system security framework 200. Input data which describes identified security vulnerabilities and can be derived from a number of sources. In one example, the security issues are documented in security reports 205 that document the relevant security assessment. The hardware security features determined by the component selections are detailed in a bill of materials 220. There may be unanticipated failure modes documented in vendor component errata 210. There are security design guidance and expectations 215. This information is converted into quantitative data 225. This quantitative information 225 is used to calculate a measure of the security risk which can be used as a Technical Performance Measure (TPM) 240. The use of a defined set of quantitatively measurable security metrics provides a consistent basis of evaluation that can scale with the system, be it a computer chip or an aircraft carrier under analysis. The ability to quantify security with a TPM allows engineers and designers to have an objective rationale for why one design offers greater security over an alternative (Trade Study Analysis) 245. The use of TPMs also enables better communication 230 such as between engineers and the evaluators and risk management and tracking for system security engineering because a quantitative representation of a capability gap produced by a systematic, complete, analysis 235 is more consistently understood than a qualitative representation of the same capability gap.

Figure 3:
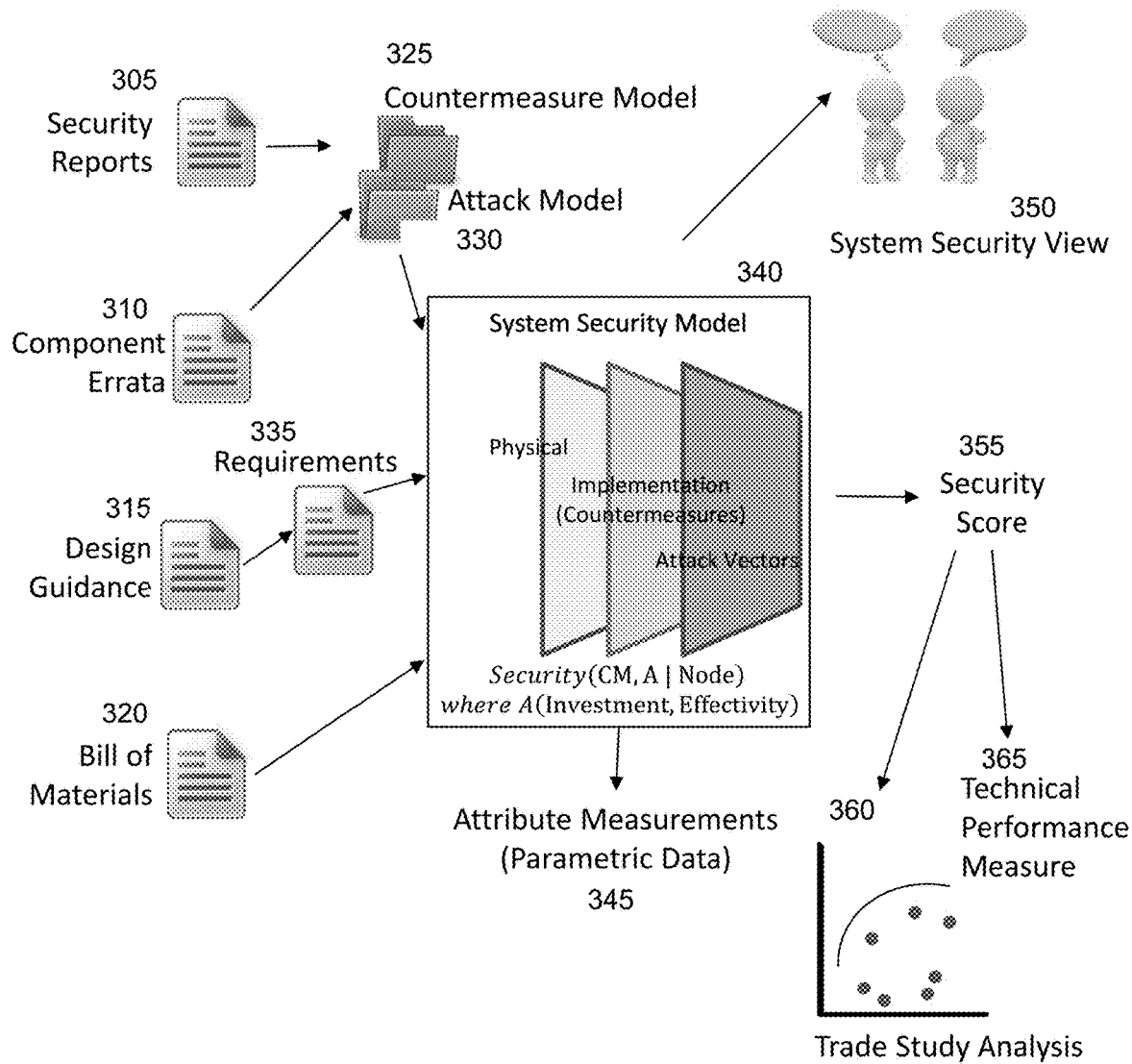
FIG. 3 depicts the organization of information within the framework in accordance with an embodiment.

FIG. 3 depicts a framework 300 that establishes a way to decompose and organize system information to perform security analysis in a structured and systematic way. Security relevant information from the system context, usage, and design are combined with security domain knowledge on Attacks (Models) 330, Countermeasures (Models) 325, and component failure modes (Security Reports) 305 to obtain Parametric Data 345 for calculating a Security Score 355. Security Score 355 is a numerical representation of the security performance or potential vulnerability of the system under analysis. A common set of measurable security relevant attributes is used to derive the parametric data from the input sources. The System Security View 350 captures the traceability from the design inputs-constraints and Requirements 335 (with input from Design Guidance 315) through the physical and functional representation of the System (Security Model) 340 to the security analysis and resulting Security Score 355. Security Score 355 provides input to Trade Study Analysis 360 and Technical Performance Measure 365. This traceability and derivation of paramedic data provides analytical value and decision making support.

Framework 300 supports hierarchic systems where the level of analysis is determined by the boundary which isolates components or subsystems, commonly called the system under analysis. Lower level analysis informs and is leveraged by higher level analysis as justification for attribute values, but is not mandatory for performing higher level analysis. Security relevant input information is organized into models. Information about possible attacks and countermeasures including dependencies or prerequisites, and a description of the process is captured in security use cases. The set of security use cases which describe the interaction of an attacker with the system to extract sensitive information or compromise system performance make up the Attack Model 330. The Countermeasure Model 325 is the set of use cases which describe how an attacker's goal can be impeded or blocked. The use cases are narratives of attack scenarios and describe the actions and possible success and failure scenarios an attacker performs with the system to meet a goal. The Attack Model 330 and Countermeasure Model 325 include scenarios which cover all phases of the product lifecycle from concept creation to development/EMD, low rate initial production (LRIP), full rate production (FRP), fielding/operations/sustainment, and decommissioning. In embodiments commercially available software tools support this type of information as a use case diagram where actors and activities are depicted. Attack Model 330 and Countermeasure Model 325 also include the security attribute estimation rational for the various attacks and countermeasures described in the security use cases. This rational can be obtained from security lab reports and vendor errata 310 for identified failure modes. These models are living data artifacts which can be leveraged as a teaching resource, or applied to multiple product development projects and grown through input from multiple subject matter experts.

Security attributes are measured for the identified attack vectors and countermeasures. The security Attribute Measurements 345 are the parametric data used to calculate the quantitative Security Score for the system under analysis. Each identified attack or vulnerability has a measurement for each corresponding security attribute.

The linkage/traceability of Requirements 335, attacks, countermeasures, and system components (Bill of Materials) 320, provides visibility to decision-making support artifacts to objectively compare designs to assess a good design from a great design. It is possible to analyze the system to determine the points of greatest security risk and assess if the proposed architecture can meet the security protection objectives. Identified weaknesses can be traced to their source and the rational for the vulnerability evaluation is documented in the form of attribute measurements which are justified by information in the Attack Model 330. It is possible to apply additional countermeasures or modify the design which is equivalent to adding rows to or modifying attribute measurements in the vulnerability matrix. Similarly the impact of partial implementation and component upgrades is represented in the framework by removing rows from or updating the vulnerability matrix. Traceability enables updates in the vulnerability matrix to be propagated through multiple system hierarchy levels for impact analysis.

A model provides a representation of the security relevant information for the physical system under analysis and is the basis for the attack vector identification and vulnerability analysis. In embodiments the system under analysis is abstracted to a combination of primitive categories such as:

1) external interfaces which provide access to elements or sub-systems external to the system under analysis as defined by the system boundary 2) memory which can be further differentiated as non-volatile memory (NVM) which persists over power cycles or volatile memory such as cache, 3) internal interfaces like data buses, 4) configuration registers which provide information about features or behaviors during initialization, 5) Keystore which is used to store cryptographic information such as encryption/decryption keys, and 6) processing which are resources specifically designated for manipulating data/information such as the execution of algorithms and mathematical operations. The primitives provide a simplified representation of the system under analysis. The primitives also establish a common terminology with the security use cases and are the foundational building block of the attack/countermeasure analysis. There are domain or industry specific terms that are used to identify and describe primitives to be intuitive for engineers within that domain.

FIG. 4 is an example 400 of how a commercial Field Programmable Gate Array (FPGA) chip can be modeled as a collection of primitives. The example FPGA is a representation which contains the following elements: 1) Programmable logic elements commonly referred to as fabric 415. The fabric is reset once power is removed from the FPGA. 2) Configuration bitstream 440 typically resides in memory external to the FPGA and configures the FPGA fabric for the intended application. 3) Designated I/O pins (bank) 420 access the configuration bitstream, and send information to or receive information from other elements in a circuit card assembly (CCA). 4) Control Registers 445 enable or disable device features. Control Registers 445 are configured during device provisioning, and persist over power cycles and can control chip features which are activated at power on. 5) Security features in the form of designated eFUSE registers 405 store encryption keys and a security segment 410 consisting of segregated logic blocks for performing cryptographic functions. The surrounding grey box indicates the physical boundary of the chip housing.

In embodiments the System Model represents a chip, a Circuit Card Assembly (CCA), a Line Replaceable Unit (LRU), or platform as defined by the system boundary. Salient physical and functional components within the system boundary are captured in the model.

Table 450 in FIG. 4 details the primitive category applied to specific elements in the System Model of the generic FPGA. The programmable fabric 415 of the FPGA is categorized as processing because the logic elements of the FPGA fabric execute the data processing algorithm. The pins on the FPGA package which are reserved for input and output signals are commonly referred to as I/O Banks 420 and are the physical access port. These physical ports are categorized as an external port. FPGAs can be manufactured with integrated support for a variety of interface protocols. In embodiments the FPGA contains integrated support for serializer/reserializer (SerDes) 425 and peripheral connector interface express (PCIe) 430. The example chip also contains a Joint Test Access Group (JTAG) port 435 and a connection to external memory where the configuration bitstream is stored 440. JTAG 435 is used for test both in manufacturing and design, and is a common embodiment configuration mode option. JTAG 435 is classified as a port because it has dedicated pathways, whereas SerDes 425 and PCIe 430 are interfaces because the I/O bank can be configured for a specific interface. The terms port and interface are frequently used interchangeably, however in conducting a security analysis the differentiation between a physical port and an interface protocol can be meaningful. The configuration bitstream 440 is categorized as non-volatile memory (NVM) because, regardless of the selected configuration mode for the FPGA, the fabric configuration instructions are typically stored in memory which persists over power cycles. The eFUSE registers 405 in the FPGA control features which take effect as soon as the FPGA is powered, is categorized as a control register. The eFUSE registers 405 dedicated to storing cryptographic key material are categorized as Keystore because of their specialized function. The dedicated logic blocks which make up the integrated security segment for performing cryptographic functions with the cryptographic keys are categorized as processing elements.

This method of decomposition and abstraction is compatible with model-based techniques and tools and, in embodiments, is facilitated by software for systems modeling or spreadsheet management. Emergent behaviors of the design are captured and analyzed at the next higher hierarchical level; this decomposition methodology forms the basis for the relative scoring using the System Security Model 340.

Attack/countermeasure analysis is conducted systematically based on the identified primitives and all relevant attacks in the Attack Model 330. The elements in the System Model are also attributed with the system state (at rest, initialization, standby, runtime, and shutdown) when an attack would be relevant. The use cases in the Attack Model 330, which cover the entire lifecycle of the product, also have primitive category and system state attributes. Security attacks are commonly represented as chains of events with interdependencies and multiple possible permutations. To organize and reduce the number of permutations to be analyzed, the primitive and system state attributes are used to filter the Attack Model and Countermeasure Model use cases. Attack/countermeasure analysis is conducted by evaluating each primitive in the system model for possible vulnerabilities across each of the applicable system states. Technical information from security lab assessments and hardware vendor errata reports 310 is captured in the Attack Model 330 and informs possible attack scenarios on the system under analysis. The primitive category and system state attributes allow associations between the System Model, Attack Model 330, and Countermeasure Model 325 to be made quickly. The information in the models can be filtered such that the filtered number use cases in the Attack Model 330 or Countermeasure Model 325 for a specific primitive and system state combination is manageable.

FIG. 5 adds the system state (At Rest, Initialization, Runtime, Return to Rest) to the elements depicted in the FPGA modeled in FIG. 4. The states are shown in table 500. The system states are applicable to any electronic system that transitions from powered off (no electrical power applied to the system and the system is At Rest) to operating (electrical power is applied, the system is performing its intended function and the system is in the Run Time state). The duration in any one system state is dependent on the operational context of the system. As an example, the eFUSEs 530 which make up the Keystore are read by the FPGA only during configuration, this corresponds to the Initialization system state because power has been applied to the FPGA; however, it has not begun performing its intended function, so the Run Time system state option does not apply. Since the eFUSEs are non-volatile memory, it is possible to modify an eFUSE when no power is applied, this corresponds to the At Rest system state. Based on these assertions, the information in the eFUSE registers 530 which make up the Keystore are vulnerable to modification At Rest and during Initialization, therefore these states are selected for security score analysis. As a second example, evaluation of the FPGA Fabric 540 which supports Processing operations and the logic pathways are configured by the configuration bitstream during Initialization. The Fabric 540 is vulnerable during Initialization and Run Time when an alternate configuration bitstream can be used to modify the function of the FPGA, therefore the states Initialization, Runtime, and Return to Rest are selected for security score analysis. It may be possible to permanently modify a logic cell in the FPGA Fabric while the chip is At Rest. This would most likely render the chip inoperable. This scenario is viewed to be possible but not probable so the system state of At Rest is not selected for additional analysis. Activities in addition to mission operation, such as maintenance are to also be considered when identifying system states with vulnerabilities for security score analysis. As previously described, further FPGA Elements comprise bitstream 505; I/O Bank 510; SerDes 515; JTAG 520; PCIe 525; Control register 535; and Security Segment 545.

Figure 6:
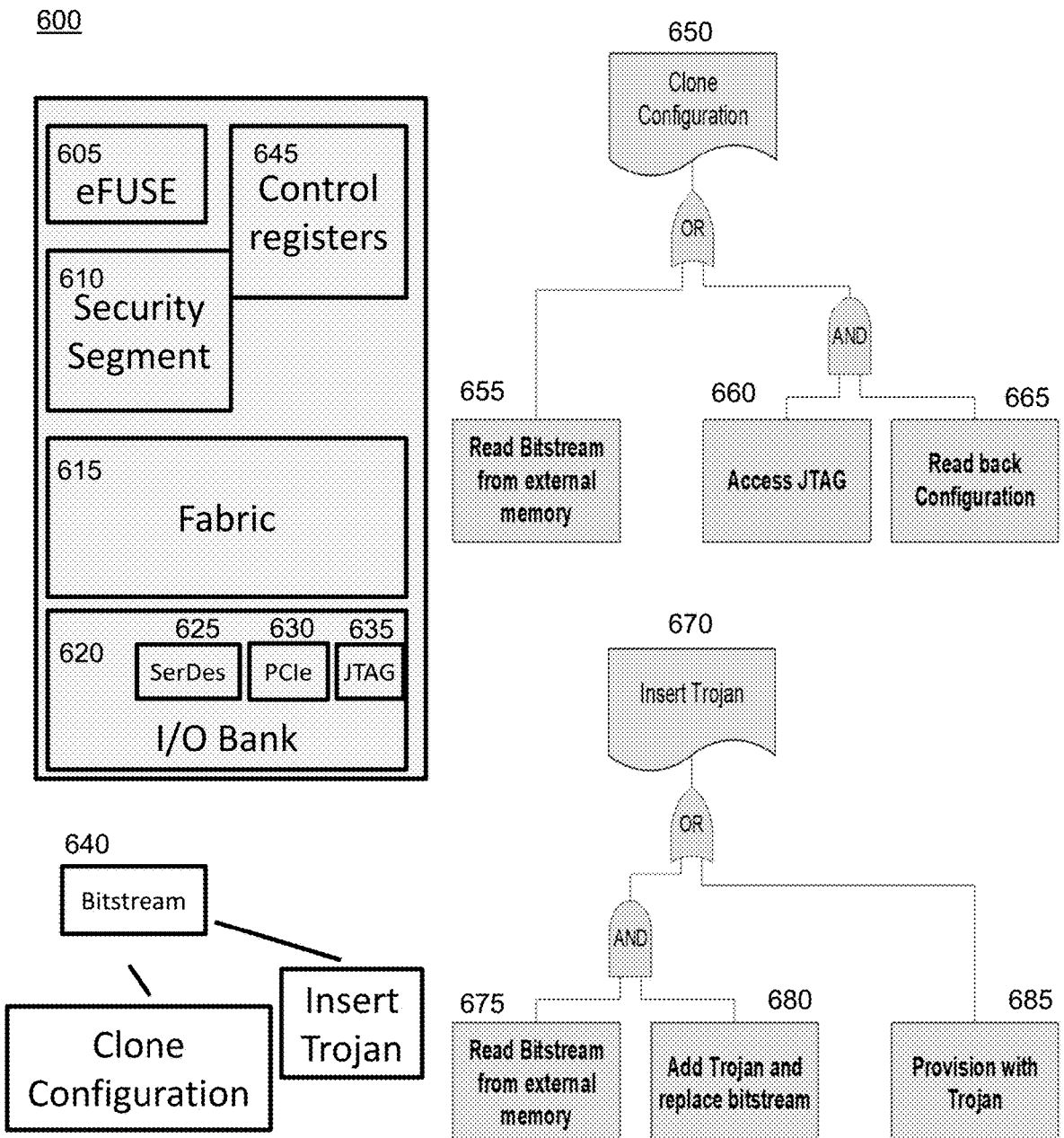
FIG. 6 depicts a possible attack on an exemplar Field Programmable Gate Array (FPGA) in accordance with an embodiment.

FIG. 6, FPGA Representation with Attack Analysis 600 builds on the System Model representation of the FPGA, where detailed attack/countermeasure analysis is performed based on the location and movement of sensitive information. As mentioned in FIG. 4, the example FPGA is a representation which contains the following elements: 1) Programmable logic elements commonly referred to as fabric 615; Configuration bitstream 640; Designated I/O pins (bank) 620; and Control Registers 645. Security features in the form of designated eFUSE registers 605 store encryption keys and a Security Segment 610 consisting of segregated logic blocks for performing cryptographic functions. The surrounding grey box indicates the physical boundary of the chip housing. In embodiments the FPGA contains integrated support for serializer/reserializer (SerDes) 625 and peripheral connector interface express (PCIe) 630. The example chip also contains a Joint Test Access Group (JTAG) port 635. In the example shown in FIG. 6, the FPGA utilizes a proprietary algorithm contained in the bitstream 640, which provides the configuration for the FPGA Fabric 615 needed to execute the algorithm. The proprietary algorithm is considered sensitive information. Working one state at a time, it systematically considers attacks from the Attack Model 330 based on the primitive and system state pair. The attacks discussed in this example are cloning of the configuration 650, and insertion of a Trojan (malware, etc.) 670 into the bitstream 640. The goal of the attack examples is to access or modify the sensitive information. In this example, the Attack Model 330 would contain a use case, with the Memory (NVM) and At Rest attributes, which describes how information can be copied from memory 655, 675. The Attack Model 330 would also contain a use cases from other product lifecycle phases. For example, a use case describing how an attacker might modify the bitstream 640 during device provisioning 685 or a use case describing how an attacker might modify the bitstream as a maintenance activity 675, 680. The Attack Model 330 would also contain uses cases with the Processing and Run Time attributes, of the filtered options, the use case describing read back 655, 665 of the fabric configuration through the JTAG port 660 would be selected as applicable to the FPGA presented in this example. The Attack Tree for these two attacks is shown in FIG. 6. Attack Trees are a tool for security analysis and document the high level steps an attacker would perform for a given attack scenario. The attack trees for the example attacks illustrate that there can be multiple ways to perform an attack, and attacks consist of multiple steps. An attack tree analysis is not required to identify attacks and populate the Vulnerability Matrix. It is included in FIG. 6 as a way of graphically conveying the information.

FIG. 7 depicts a Vulnerability Matrix 700 for the previously discussed attacks. The attacks are measured against the following attributes: FPGA Element 705; Primitive Category 710; State 715; attack 720; Interdependency 730; Investment 735 (the monetary investment such as the cost of specialized equipment), Duration 740 (the time to execute an attack such as collecting empirical data of the system behavior), Probability of success 745 (likelihood the effort will produce the desired outcome), Probability of destruction 750 (likelihood the device is rendered unusable by the attack, this is applicable for invasive and semi-invasive methods), Technology node (is applicable for hardware level analysis and is a scaling factor based on the process node for the hardware fabrication process), Number of samples (is the number of systems available for an attack). These attributes capture the cost (financial and temporal) and efficacy of an attack which are scaled by the availability (number Samples) and resolution of the hardware manufacturing process (Technology node). The information in the Vulnerability Matrix, FIG. 7, is informed by the information in the Attack Model 330.

For the attack in row 1 of the table 700, the information in each column is obtained from the Attack Model 330 as follows. In this example, Attack Model 330 contains a use case describing how an attacker can copy information from non-volatile memory on a chip using common equipment like a PC (low Investment 735). Information about the type of non-volatile memory and how to access information is publically available and the activity can be performed quickly (low Duration 740). The attacker needs to access traces on the CCA to interface with the memory device and there is a slight chance of accidental damage (very low Pdestruct 750). The CCA has multiple memory devices and the attacker may initially pick the wrong one, but will ultimately be successful (Psuccess nearly 1 745). The bitstream resides in non-volatile memory for all system states; analysis of the other states provides no additional considerations so only one State 715 is specified in the table for this example. The technology Node 755 is determined by the part selection specified in the bill of materials for the product. The number of Samples 760 is informed by manufacturing targets. These parameters are constants for the system under analysis. For this example both are 1.

The attacks in rows 2 and 3 of the table 700 capture the Attack Model scenario where the attacker can obtain configuration information by using a test mode feature to read back the Fabric configuration through the JTAG port. As depicted in the attack tree shown in FIG. 6, this attack is broken down into two steps in the Vulnerability Matrix 700 as indicated by the reference in the Interdependency column 730 for row 3 which indicates that Read back of the FPGA Fabric (row 3) is dependent on physical access to the JTAG port (row 2). This attack requires some additional equipment for supplying voltage signals to the FPGA (investment is slightly higher 735 row 3). Information about the FPGA pinout and test mode behaviors are easily obtained from vendor documentation (Duration 740 is low and Psuccess 745 is high). The Psuccess 745 of row 3 is slightly lower to account for possibly selecting the wrong pin or incorrect signal level or timing and the need to correctly interpret the Fabric configuration. The attack is minimally invasive (Pdestruct 750 is low). The Technology Node 755 and number of Samples 760 are constants for the system under analysis and are 1 for this example.

Row 4 in the table 700 captures an insider threat scenario whereby a Trojan or other malware is included in the Bitstream during provisioning. Establishing an insider to replace the intended Bitstream file takes time and money (Investment 735 and Duration 740 are higher). It is possible for the insider to be caught (Psuccess 745 is less than 1). This attack is non-invasive to the device so Pdestruct 750 is 0. The Technology Node 755 and number of Samples 760 are constants for the system under analysis and are 1 for this example.

Row 5 in Table 700 captures a scenario where the original Bitstream is replaced with one containing malware as a maintenance upgrade. As depicted in the attack tree shown in FIG. 6, this attack is broken down into two steps in the Vulnerability Matrix 700 as indicated by the reference in the Interdependency column 730 for row 1 which indicates that replacing the Bitstream file with a version that contains a Trojan (row 5) depends on having the original to modify (row 1). The financial Investment is comparable to row 1, so Investment 735 is 1. An original Bitstream file needs to be obtained, and then the Trojan needs to be appropriately formatted and incorporated into the file. These activities take time, but less time than the attack described in row 4, so the Duration 740 is between 1 and 5. Since some interpretation of the Bitstream file is made, Psuccess 745 is high but slightly lower than that of row 1. The attack is non-invasive as it leverages maintenance functions, so Pdestruct 750 is 0. The Technology Node 755 and number of Samples 760 are constants for the system under analysis and are 1 for this example. Rows 4 and 5 are examples of the inclusion of vulnerability analysis of other product lifecycle phases (provisioning) and alternate activities (maintenance).

Security is assessed based on the ease with which sensitive information is obtained. The attribute measurements recorded in the Vulnerability Matrix provide the parametric data for calculating the Security Score. The Investment, Duration, Psuccess, and Pdestruct attributes capture the cost (financial and temporal) and efficacy of an attack which are scaled by the availability (number Samples) and resolution of the hardware manufacturing process (Technology Node). It is important that the relative distance or ratio between measurements of an attribute be consistent. Characterizing an attribute measurement with respect to zero can be less useful than establishing a simple, well documented, and well understood attack to define the base units for the attribute measurements. The number of samples affects the consequence of damaging a system while performing an attack; a single sample represents greater challenge and consequence if damaged as opposed to 1,000 low cost samples. Availability, as directly measured by the number of samples, does not change the cost (Investment, Duration) or efficacy (Psuccess, Pdestruct), but does impact the security risk so it is a scaling factor used in calculating the Security Score. The Technology Node relates to the pitch spacing of integrated components. For hardware based attacks, the close spacing and increased density of smaller integrated components (4 nm v 80 nm) represents a need for greater precision. Depending on the type of attack this may necessitate specialized equipment (increased Investment cost), increased number of observations for analysis based methods (increased Duration), or increased likelihood of destruction (increased Pdestruct) for invasive attacks needing increased precision. These representative examples of how the Technology Node, which is a measurement of the fabrication process, can impact the attributes of Investment, Duration, and Pdestruct in a variety of ways depending on the specifics of the attack. Within this framework and Security Score calculation, the Technology Node is treated as a scaling factor, this allows comparison of hardware components at different Technology Nodes.

The Technology Node is no longer a direct measurement of the logic element spacing and there is currently no standard for calculation of the Technology Node. However, smaller Technology Node values imply higher density logic elements. In embodiments, to address functional equivalence across hardware vendors, the Technology Node should be mapped to an ordinal scale to determine the parameter for the Vulnerability Matrix. In embodiments, this assessment and mapping is performed by a subject matter expert and documented so it can be applied consistently.

The Security Score represents the security robustness for the system under analysis. A low Security Score indicates relative ease in obtaining sensitive information, low security performance. A high Security Score indicates a greater challenge to obtain sensitive information, high security performance. If the Security Score is less than the desired security performance, countermeasures are needed. The security design is optimized by maximizing the cost (financial Investment), Duration, and likelihood of destruction (Pdestruct) while minimizing the likelihood of success (Psuccess). This is the attribute equivalent of forcing the attacker to attempt more complex attacks against more complex countermeasures with lower level of success and higher probability of sample destruction.

For a Vulnerability Matrix which contains the attribute measurements for attacks $A_1 \ldots A_n$, the Security Score for any attack n is calculated using the equation:

$$S(A_n) = S_n = \frac{\$_n D_n}{Ps_n(1-Pd_n)Q_n N_n}$$

Where $A_n$ is a specific attack against a specific element of the system model. An attack, A, has the corresponding array of parameters from the attribute measurements the Vulnerability Matrix:

$$A = \begin{pmatrix} \text{Investment} \\ \text{Duration} \\ \text{Psuccess} \\ \text{Pdestruct} \\ \text{Num Samples} \\ \text{Tech Node} \end{pmatrix} = \begin{pmatrix} \$ \\ D \\ Ps \\ Pd \\ Q \\ N \end{pmatrix}$$

Within this framework countermeasures are viewed to possess the same measurable attributes as attacks. The Countermeasure Model contains a set of use case descriptions for how a countermeasure can challenge a class of attack. For the example of cloning the FPGA Bitstream configuration 650 described previously, encrypting the Bitstream is a countermeasure. The attacker must now obtain the encryption key or decrypt the information through brute force methods. Brute force methods may not require additional capital Investment, but the Duration for the attack increases significantly. Both attacks and countermeasures are parameterized in terms of the same measureable attributes. The countermeasure acts as a scaling factor for each of the attributes in the attack parameter array. A countermeasure, CM, has the corresponding array of parameters from the Vulnerability Matrix:

$$CM = \begin{pmatrix} \text{Investment Scaling Factor} \\ \text{Duration Scaling Factor} \\ \text{Psuccess Scaling Factor} \\ \text{Pdestruct Scaling Factor} \\ 1 \\ 1 \end{pmatrix} = \begin{pmatrix} \$ \\ D \\ Ps \\ Pd \\ 1 \\ 1 \end{pmatrix}$$

Countermeasures do not modify the number of Samples or Technology Node, so the corresponding elements in the CM array are 1.

The parameters for an attack which is impacted by a countermeasure, A', is obtained by multiplying each attack parameter by the corresponding countermeasure scaling factor.

$$A' = A * CM = \begin{pmatrix} \$_A * \$_{CM} \\ D_A * D_{CM} \\ Ps_A * Ps_{CM} \\ Pd_A * Pd_{CM} \\ Q * 1 \\ N * 1 \end{pmatrix} = \begin{pmatrix} \$' \\ D' \\ Ps' \\ Pd' \\ Q \\ N \end{pmatrix}$$

Where Q and N, as scaling terms, are assumed to be constants for the system. The scaled parameters of A' are used to calculate the score S.

Within this framework, all attacks can be viewed as a variation on or combination of a finite set of fundamental attacks or attack strategies. For a novel attack, or for complex attacks were justification of the attribute measurements is desired, the attack can be decomposed into multiple attack steps, the attributes of the attack steps can be measured and then aggregated as follows:

For $A = A_1 \& A_2 \& A_3$ $$\text{where } A_1 = \begin{pmatrix} \$_1 \\ D_1 \\ Ps_1 \\ Pd_1 \\ Q \\ N \end{pmatrix}, A_2 = \begin{pmatrix} \$_2 \\ D_2 \\ Ps_2 \\ Pd_2 \\ Q \\ N \end{pmatrix}, \text{ and } A_3 = \begin{pmatrix} \$_3 \\ D_3 \\ Ps_3 \\ Pd_3 \\ D \\ N \end{pmatrix},$$

and Q and N are assumed to be constants for the system $$A = \begin{pmatrix} \$ \\ D \\ Ps \\ Pd \\ Q \\ N \end{pmatrix} = \begin{pmatrix} \$_1 + \$_{12} + \$_{13} \\ D_1 + D_2 + D_3 \\ Ps_1 * Ps_2 * Ps_{31} \\ 1 - ((1-Pd_1)*(1-+Pd_2)*(1-+Pd_3)) \\ Q \\ N \end{pmatrix}$$

Aggregation of attributes is suitable for highly coupled actions or for novel attacks where justification of the attribute measurements is desired.

Certain attack activities can act as enablers for other attacks by improving the effectivity of the other attack. Within this framework, enabler attacks are made up of two components, the attack itself which has measureable attributes like any other attack and the enabling aspect which alters the effectivity of other attacks. Enabling attacks typically do not improve the effectivity of any and every other attack. The enabling benefits are limited to specific other attacks, similar to the way a countermeasure challenges specific attacks. Like a countermeasure, an enabling attack is associated to other attacks in the Vulnerability Matrix and modifies the resulting Security Score calculation in the following way:

Enabling Attack=$(A_E)$, (EN) where $$A_E = \begin{pmatrix} \text{Investment} \\ \text{Duration} \\ \text{Psuccess} \\ \text{Pdestruct} \\ \text{Num Samples} \\ \text{Tech Node} \end{pmatrix} = \begin{pmatrix} \$ \\ D \\ Ps \\ Pd \\ Q \\ N \end{pmatrix} \text{ and}$$

$$EN = \begin{pmatrix} 1 \\ \text{Duration Scaling Factor} \\ \text{Psuccess Scaling Factor} \\ \text{Pdestruct Scaling Factor} \\ 1 \\ 1 \end{pmatrix} = \begin{pmatrix} 1 \\ D \\ Ps \\ Pd \\ 1 \\ 1 \end{pmatrix}$$

For an attack A that is enabled by $A_E$ the Security Score $S(A, A_E)$ is $S(A_E)+S(A')$ where $S(A')=S(A*EN)$, $$A*EN = \begin{pmatrix} \$_A * 1 \\ D_A * D_{EN} \\ Ps_A * Ps_{EN} \\ Pd_A * Pd_{EN} \\ Q * 1 \\ N * 1 \end{pmatrix} = \begin{pmatrix} \$' \\ D' \\ Ps' \\ Pd' \\ Q \\ N \end{pmatrix},$$

$$S(A') = S_{A'} = \frac{\$'D'}{Ps'(1 - Pd')QN} \text{ and}$$

$$S(A_E) = S_E = \frac{\$_E D_E}{Ps_E(1 - Pd_E)Q_E N_E}$$

In order to determine the Security Score for the system under analysis, first calculate the Security Score S for each attack, attack-countermeasure pair, or attack-enabler pair. Add the Security Score of interdependent attacks. Then identify the lowest score across the m elements defined in the System Model. This value is the Security Score for the system under analysis and represents the most vulnerable aspect based on the analysis performed. This process is repeated for each level in the system hierarchy. The example of the generic FPGA represents chip level security analysis. Provided the decomposition of platform>system>subsystem>CCA>Chip, the example represents analysis at the lowest level of the system hierarchy. The next higher level is the CCA level and the system model of the CCA would include the generic FPGA as an element. The Security Score calculated for the FPGA at the chip level becomes the Security Score for the FPGA element in the CCA hierarchy level. The CCA may have emergent properties or elements not analyzed at the chip level, these would be analyzed, included in the Vulnerability Matrix for the CCA, and used to calculate the Security Score for the CCA. For a system defined as consisting of m sub-systems the minimum Security Score from a sub-system is $S_{Element}$. The Security Score at the highest hierarchical level analyzed can be scaled by taking the base 10 log.

Security Score=Min($\{S_{Element1}, S_{Element2}, \ldots, S_{Elementm}\}$)

This method also supports temporal analysis. Security assessment can be performed with respect to the system state phases. The minimum attack score for each system state can be identified in the Vulnerability Matrix to identify security vulnerabilities. The duration in any one state phase is different system to system. Additional scrutiny may be desired for state phases with greater duration.

FIG. 8, Table 800, shows calculation of the attacks presented in the generic FPGA example. The four attack scores are calculated using the parametric data shown in FIG. 8, which represents $A_1$, $A_2+A_3$, $A_4$, and $A_1+A_5$ and are represented as $S_1$ (row 1 of table 800), $S_3$ (row 3 of Table 800), $S_4$ (row 4 of Table 800), and $S_5$ (row 5 of Table 800) respectively. The Security Score of the FPGA, as analyzed, is the minimum of $\{S_1\ S_3\ S_4\ S_5\}$. $S_1$ which corresponds to reading the Bitstream from non-volatile memory (row 1 of table 800), has the lowest pre-countermeasure Security Score and represents the greatest security risk. Applying a countermeasure of encryption (row 6 of Table 800), significantly increases the Security Score 870. With the countermeasure of encryption applied, the lowest Security Score comes from reading the FPGA fabric configuration (row 3 of Table 800). Row 2 is part of another attack as indicated by the reference to row 2 appearing in the Interdependency column 830 for another attack, so it is not the minimum of the set of attacks. To calculate the scaled Security Score of the FPGA based on the analysis provided in the example with the countermeasure, Scaled S(FPGA)=$\log_{10} \min\{S_1\ S_3\ S_4\ S_5\}$, for Table 800, this scaled Security Score is 7.

An example of a systematic approach of using this framework is to start at the lowest hierarchy level within the system, work through the states, and then iteratively expand the system boundary to the next higher hierarchy and repeat. The sequence of analysis is: Chip>CCA>subsystem>System>Platform or as appropriate for the Product Solution under analysis. At each iteration verify the System Model has sufficient detail by walking through the steps involved with each system state. Discussed parameters are specifically depicted in the Table columns of: FPGA Element 805; Primitive Category 810; State 815; Attack 820; Countermeasure 825; Interdependency 830; Investment ($K) 835; Duration 840; P(Success) 845; P(Destruct) 850; Node 855; #Samples (K) 860; and Score w/CM 870.

Figure 9:
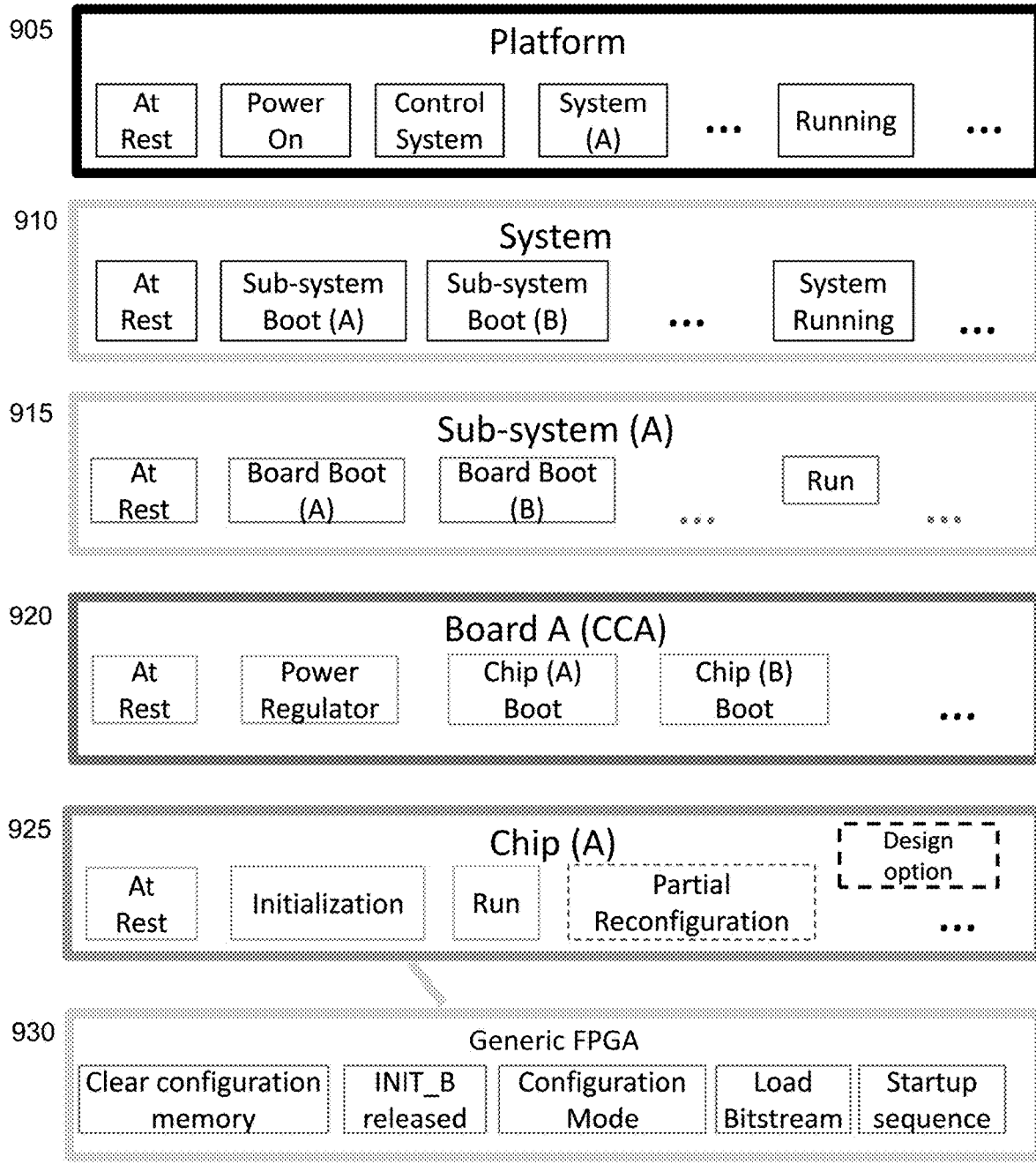
FIG. 9 depicts decomposition of a system into hierarchical levels for analysis in accordance with an embodiment.

FIG. 9 shows the system hierarchy levels 900 from Platform 905 to Chip 925. Representative steps to go from at rest to running are shown. The steps to go from running to shutdown are typically the reverse of a subset of the steps from at rest to running and have been omitted from the diagram for simplicity. Ellipses ( . . . ) allude to the additional steps which have been omitted for simplification. Understanding these process steps is helpful in understanding how sensitive information moves through the system to ensure relevant elements are captured in the System Model. A Platform 905 becomes operational, the running state, by applying power to the electronic systems and bringing them online. This process may start by activating a command and control system which then initializes the other systems on the Platform 905. At the chip level of the hierarchy, the steps for initialization of a Generic FPGA are shown 930. The system security engineer uses this information to verify that the model of the chip captures all the security relevant elements. Summarizing, the system hierarchy levels comprise the Platform 905; a System 910; a Sub-system (A) 915; a Board A (CCA) 920; Chip (A) 925; and the Generic FPGA 930. Platform 905 depicts the power on sequence steps of initialization comprising: At Rest; Power On; Control System (A); System (A); and Running. Similarly, the power on sequence steps of initialization for System 910 comprise: At Rest; Sub-system Boot (A); Sub-system Boot (B); and System Running. The power on sequence steps of initialization for Sub-system (A) 915 comprise: At Rest; Board Boot (A); Board Boot (B); and Run. The power on sequence steps of initialization for Board A (CCA) 920 comprise: At Rest; Power Regulator; Chip (A) Boot; and Chip (B) Boot. The power on sequence steps of initialization for Chip (A) 925 comprise: At Rest; Initialization; Run; Partial Reconfiguration; and any Design option. The Generic FPGA 930 depicts the power on sequence steps of initialization comprising: Clear configuration memory; INIT B released; Configuration Mode; Load Bitstream; and Startup sequence.

The system security framework organizes information in multiple artifacts which are able to accommodate simple and highly complex systems by keeping information and analysis accessible. Ease in locating and tracing information enables effective communication between design creators and design evaluators.

Figure 10:
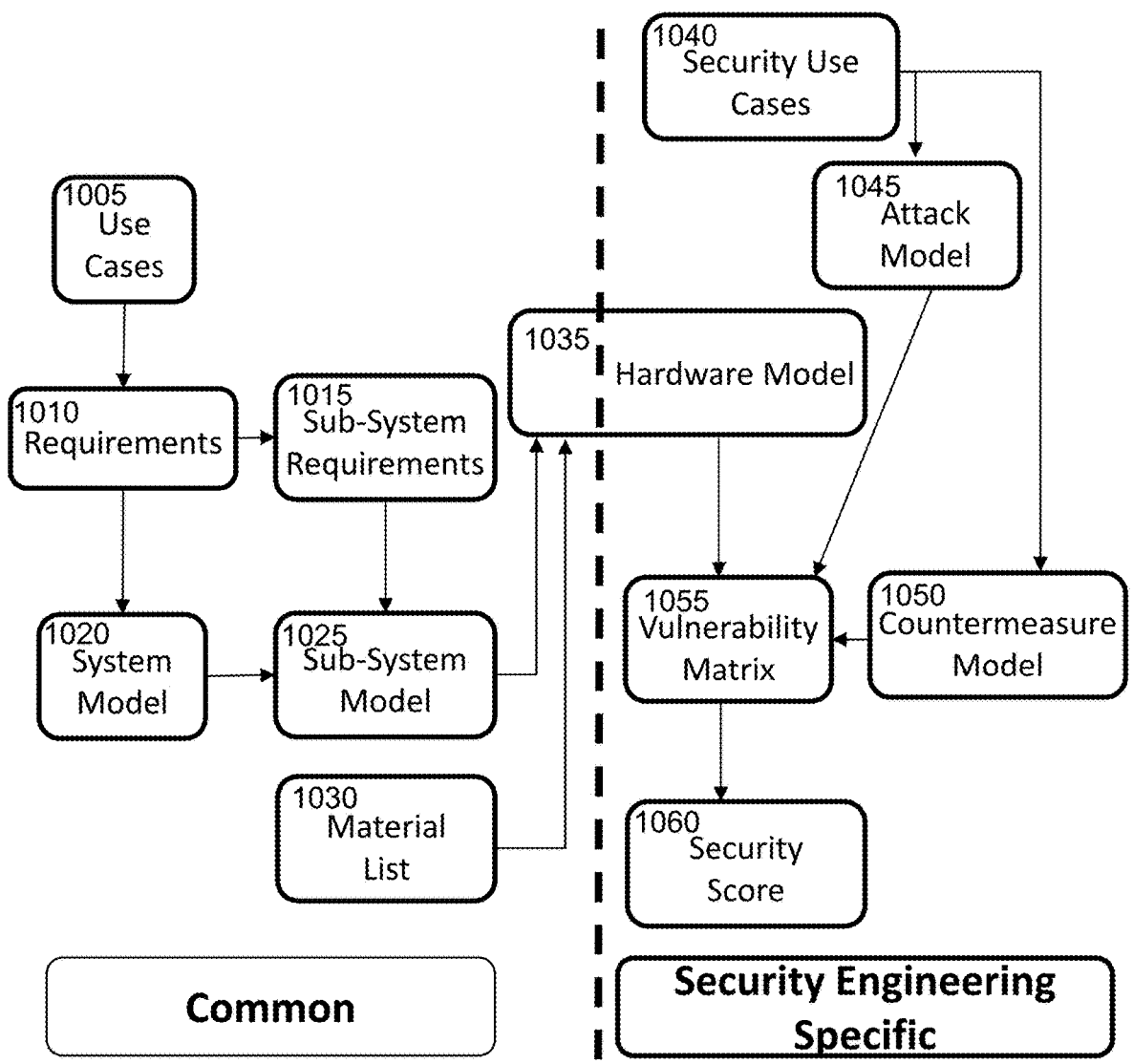
FIG. 10 depicts the relationship of framework data elements in accordance with an embodiment.

FIG. 10 System Framework Elements 1000 depicts how the framework leverages many Common Framework Data Element design artifacts such as Requirements 1010, fed by Use Cases 1005. In embodiments, Requirements 1010 comprise Sub-System Requirements 1015. Requirements 1010 provide input to System Model 1020. In embodiments, System Model 1020 comprises Sub-System Model 1025. Material Lists 1030 and Sub-System Model 1025 provide input to Hardware-level Model drawings 1035, a component of Security Engineering Specific Framework Data Elements. System Security Engineering Specific information is added through Attack Model 1045 and Countermeasure Model 1050 (each fed by Security Use Cases 1040), Hardware Model 1035, Attack Model 1045, and Countermeasure Model 1050 provide input to Vulnerability Matrix 1055. Vulnerability Matrix 1055 is then used to produce Security Score 1060. The System Security View provides a security focused representation of the system under analysis through the incorporation of the Attack Model 1045, Countermeasure Model 1050, System Model 1020, and Vulnerability Matrix 1055. Some details are omitted to reduce complexity and increase focus.

Figure 11:
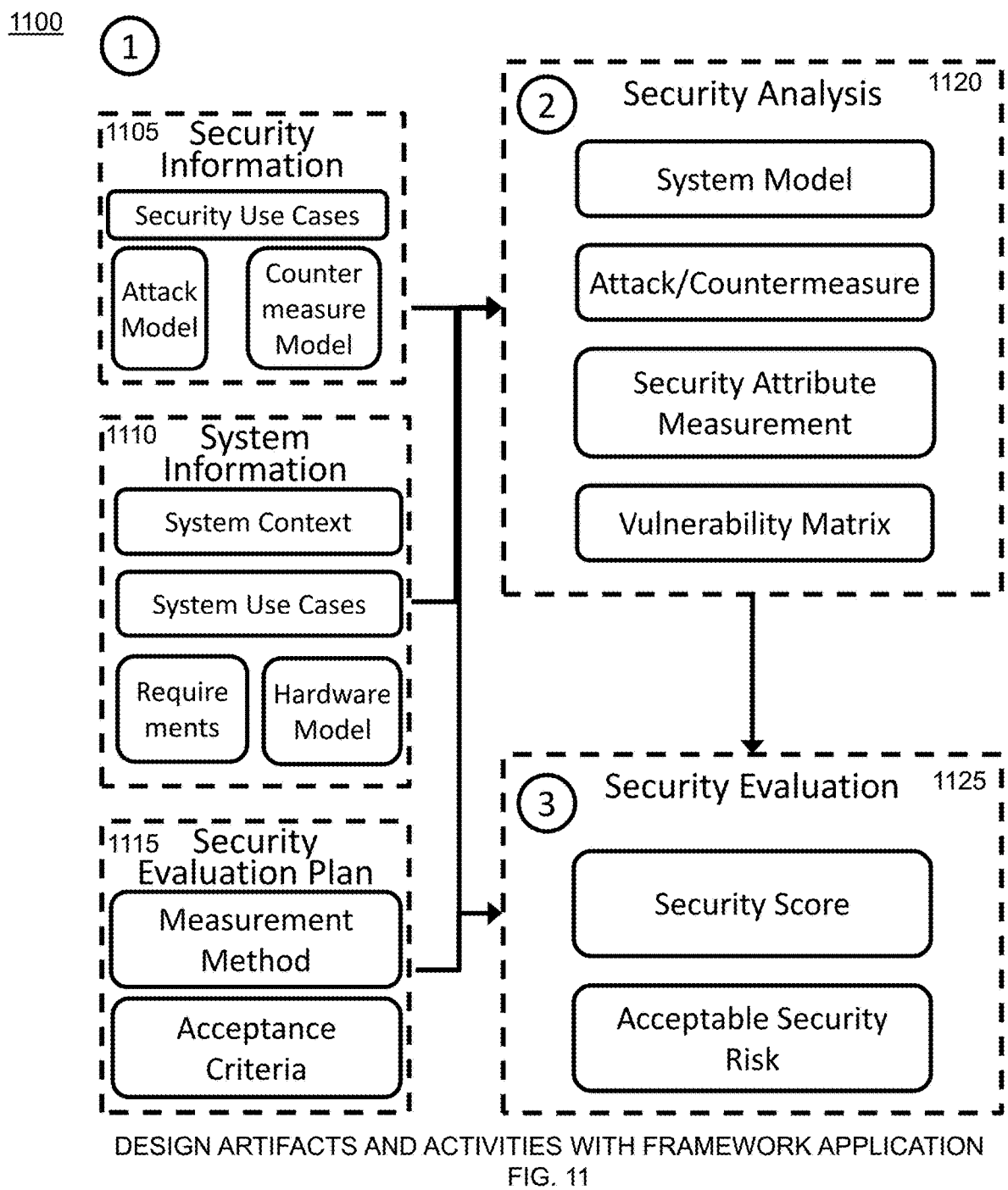
FIG. 11 depicts design artifacts and design activities as they relate to a nominal embodiment of the framework in accordance with an embodiment.

FIG. 11 shows design artifacts 1100 associated with the implementation of this framework. These design artifacts support security analysis and security evaluation. Components previously presented and grouped here comprise Security Information 1105; System Information 1110; a Security Evaluation Plan 1115; Security Analysis 1120; and Security Evaluation 1125. This framework uses analysis assumptions, measurement practices, attribute measurements, and security acceptability criteria (provided there is not an explicit Requirement TPM) which are recorded in Security Evaluation Plan 1115. The Security Score of Security Evaluation 1125 is a unit-less value, however defining the unit of measure for the attribute measurements is critical for the uniform application of the measurement scale. The accuracy of the relative magnitude of an attribute measurement across attacks, countermeasures, and enablers is a critical characteristic of the framework. Any qualitative measures should also be defined in the Security Evaluation Plan 1115 document to establish concurrence between engineers on the interpretation of rankings, qualitative descriptions, and the application of attribute measurements.

FIG. 12 depicts examples of how this framework can also support the use of rank order and qualitative scales 1200. Since these semi-quantitative and qualitative scales do not support division, the Security Score parameters are simplified so that Investment is defined as financial cost and Duration and Effectiveness are defined as probability of achieving the desired outcome. The Security Score of Security Evaluation 1125 is determined based on a lookup table defined using the chosen scales for Investment and Effectiveness. The information in the Security Evaluation Plan 1115 allows Security Scores to be consistently calculated and interpreted and the criteria for an acceptable design to be less subjective. The Security Evaluation Plan 1115, System Information 1110, and Security Information 1105 data elements are prerequisites for performing the Security Analysis 1120 and Security Performance Evaluation 1125.

The framework supports both security analysis of hierarchical system levels as well as security analysis over product lifecycle phases. As with the generic FPGA example, attacks during provisioning and maintenance activities were identified. In embodiments this is extended through product end of life.

Figure 13:
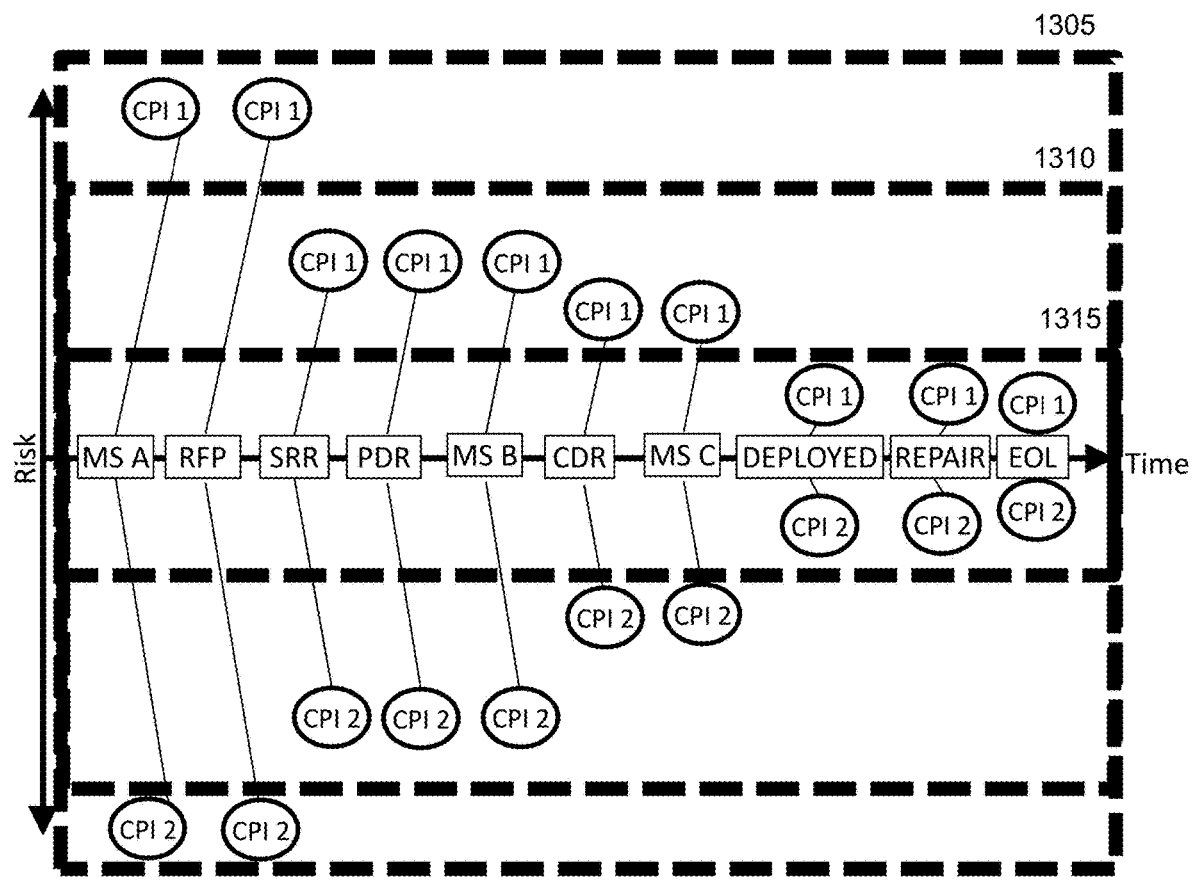
FIG. 13 depicts a visualization of security risk over the product lifecycle; scenario 1 in accordance with an embodiment.

FIG. 13 is a First Scenario visualization diagram 1300 depicting changes in the Security Score over the product life cycle. In this example, the risk of sensitive information exposure is defined over the lifecycle of a defense electronics acquisition program. The length of the ribs of the fishbone are related to the security risk which is calculated as the shortcoming (deficiency) of the Security Score for the system relative to the desired (target) security performance. The risk levels are divided into three categories, "green" low risk 1315 where the security score is no more than 10% deficient, "yellow" medium risk 1310 where the security score is greater than 10% but less than 75% deficient, and "red" high risk 1305 where the security score is 75% or more deficient. Abbreviations include:

MSA=Milestone A
RFP=Request for Proposal
SRR=System Requirements Review
PDR=Preliminary Design Review
MSB=Milestone B
CDR=Critical Design Review
MSC=Milestone C
EOL=End of Life
CPI=Sensitive Information As the level of potential exposure of sensitive information (CPI 1, CPI 2) changes over the product lifecycle, so does the desired level of security performance. In this visualization, it is assumed that the sensitive information is either deprecated or destroyed at end of life. The information is no longer sensitive which minimizes the risk, or the exposure is significantly reduced which minimizes the risk.

Figure 14:
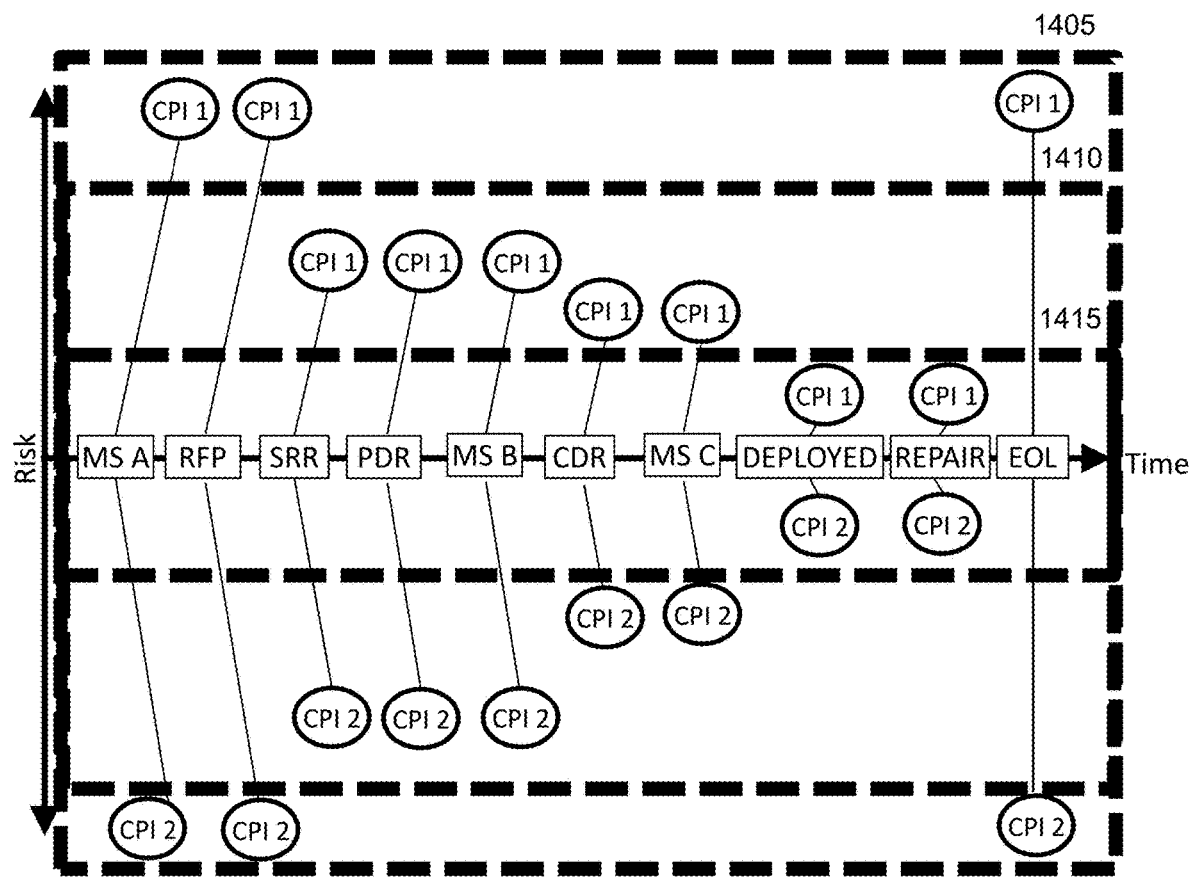
FIG. 14 depicts a visualization of security risk over the product lifecycle; scenario 2 in accordance with an embodiment.

FIG. 14 is a Second Scenario visualization diagram 1400 depicting changes in the Security Score over the product life cycle. In this visualization, it is NOT assumed that the sensitive information is either deprecated or destroyed at end of life. As in FIG. 13, the risk levels are divided into three categories, "green" low risk 1415 where the security score is no more than 10% deficient, "yellow" medium risk 1410 where the security score is greater than 10% but less than 75% deficient, and "red" high risk 1405 where the security score is 75% or more deficient. Abbreviations are the same as in FIG. 13. In this example, control activities cease at end of life (EOL) and the risk is high, in the "red" region, as the level of security provided is less than 25% of the desired level of security performance.

Figure 15:
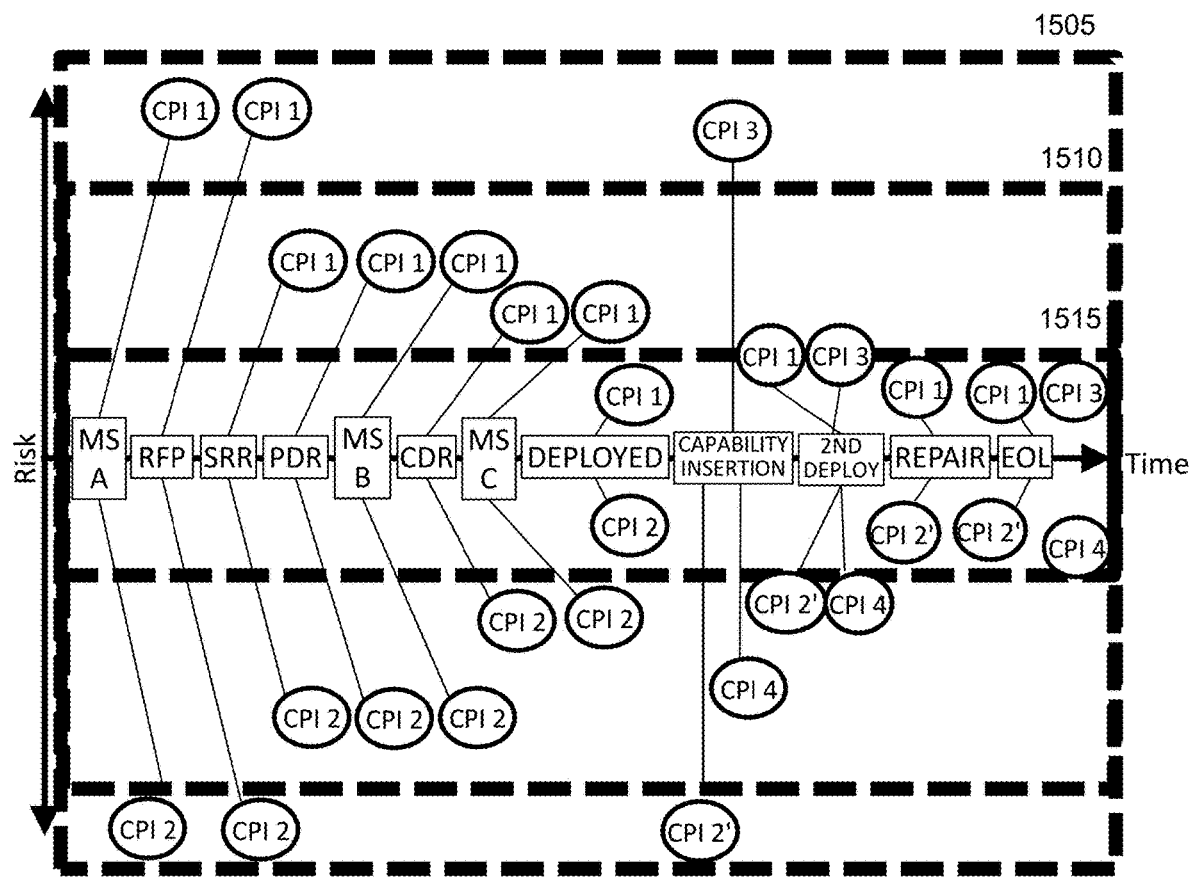
FIG. 15 depicts a visualization of security risk over the product lifecycle; scenario 3 in accordance with an embodiment.

FIG. 15 depicts a risk visualization of a Third Scenario 1500. As in FIG. 13, risk of sensitive information exposure is defined over the lifecycle of the program, and the length of the ribs of the fishbone are related to the level or risk/exposure. New capability is added, represented by CPI 3 and CPI 4, and existing capability is modified, represented by CPI 2'. Any new or modified capability must be re-evaluated and protected. Additional protections are implemented in the 2ND Deployment which brings the risk closer to the "green" region. Again, this scenario assumes the sensitive information is either deprecated or destroyed at end of life. "Green" risk/exposure zone 1515, "yellow" risk/exposure zone 1510, and "red" risk/exposure zone 1505 are shown. These visualizations capture the security impact of technology insertion, partial security implementation, hardware upgrades, and lifecycle phase transitions.

The computing system used for the system security evaluation model for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A system for security evaluation providing a quantitative methodology for calculating a relative risk of a system security architecture, the system comprising:
   a Security Evaluation Framework;
   said Security Evaluation Framework comprising a System Security Model;
   said System Security Model configured to:
     receive a Security Report for a system architecture;
     receive a Vendor Component Errata Report for said system architecture;
     receive security Design Guidance and expectations for said system architecture;
     receive a Bill of Materials for said system architecture;
     output a System Security View for said system architecture; and
     produce a Security Score relative risk report for said security evaluation of said system security architecture whereby said relative risk of said system security architecture is determined;
   wherein Data Elements of said Security Evaluation Framework comprise:
   Common Elements; and
   Security Engineering Specific Elements;
   said Common Elements comprising:
     Requirements;
     fed by Use Cases;
     Requirements comprising Sub-System Requirements;
     said Requirements providing input to
     a System Model, said System Model comprising a Sub-System Model; and
     Material Lists;
   said Security Engineering Specific Elements comprising:
     a Hardware Model;
     an Attack Model;
     a Countermeasure Model;
     a Vulnerability Matrix;
     said Hardware Model, said Attack Model, and said Countermeasure Model providing input to said Vulnerability Matrix; and
     a Security Score produced from said Vulnerability Matrix;
   wherein said Sub-System Model and said Material Lists provide input to said Hardware Model.

2. The system of claim 1, wherein said Security Score comprises:
   a Technical Performance Measure; and
   a Trade Study Analysis.

3. The system of claim 1, wherein said system comprises at least one Field Programmable Gate Array (FPGA) chip comprising elements of:
   Programmable logic elements (Fabric);
   configuration Bitstream;
   a Designated I/O Pin Bank providing access to said Bitstream;
   Control Registers to enable or disable device features;
   designated eFUSE registers comprising security features; and
   a Security Segment comprising segregated logic blocks for performing cryptographic functions.

4. The system of claim 3, wherein said FPGA Designated I/O Pin Bank comprises:
   a serializer/reserializer (SerDes) interface;
   a Peripheral Connector Interface express (PCIe) interface; and
   a Joint Test Access Group (JTAG) port.

5. The system of claim 3, wherein Primitive Categories of said FPGA Elements comprise:
   external interfaces;
   Non-Volatile Memory (NVM);
   Internal Interfaces;
   Configuration Registers;
   Keystore; and
   Processing.

6. The system of claim 1, wherein System States comprise:
   At Rest;
   Initialization;
   Run Time; and
   Return to Rest.

7. The system of claim 4 wherein a System Model representation of said FPGA comprises a Configuration Cloning attack analysis of an Attack Model comprising:
   reading said Bitstream from external memory; or accessing said JTAG port; and
   reading back a configuration of said Fabric through said JTAG port.

8. The system of claim 4 wherein a System Model representation of said FPGA comprises a Trojan attack analysis of an Attack Model comprising:
   reading said Bitstream from external memory; and
   adding said Trojan and replacing said Bitstream; or
   provisioning with said Trojan.

9. The system of claim 4 wherein a Vulnerability Matrix comprises attributes of:
   FPGA Element;
   Primitive Category;
   System State;
   Attack;
   Interdependency;
   Investment;
   Duration;
   Probability of Success P(Success);
   Probability of Destruction P(Destruction);
   Tech Node, and
   Number of Samples.

10. The system of claim 4 wherein a Vulnerability Matrix with a Security Score comprises attributes of:
    FPGA Element;
    Primitive Category;
    System State;
    Attack;
    Countermeasure;
    Interdependency;
    Investment;
    Duration;
    Probability of Success P(Success);
    Probability of Destruction P(Destruction);
    Tech Node,
    Number of Samples; and
    said Security Score with Countermeasures.

11. The system of claim 1, wherein a hierarchy of said system comprises:
    a Platform;
    a System;
    at least one Sub-system;
    at least one Board A Circuit Card Assembly (CCA);
    at least one Chip;
    at least one FPGA.

12. The system of claim 11, wherein power on sequences of said system hierarchy levels comprise:
    for said Platform, At Rest, Power On, Control System (A), System (A), and Running;
    for said System, At Rest, Sub-system Boot (A), Sub-system Boot (B), and System Running;
    for said at least one Sub-system, At Rest; Board Boot (A), Board Boot (B), and Run;
    for said at least one Board A Circuit Card Assembly (CCA), At Rest, Power Regulator, Chip (A) Boot, and Chip (B) Boot;
    for said at least one Chip, At Rest, Initialization, Run, Partial Reconfiguration, and any Design option;
    for said at least one FPGA, Clear configuration memory, INIT B released, Configuration Mode, Load Bitstream, and Startup sequence.

13. The system of claim 1, wherein Framework Design Artifacts and Activities comprise:
    a Security Information Module;
    a System Information Module;
    a Security Evaluation Plan Module;
    a Security Analysis Module; and
    a Security Evaluation Module;
    said Security Information Module comprising:
        said Security Use Cases, said Attack Model, and said Countermeasure Model;
    said System Information Module comprising:
        System Context, said System Use Cases, said Requirements, and said Hardware Model;
    said Security Evaluation Plan Module comprising:
        a Measurement Method and Acceptance Criteria;
    said Security Analysis Module comprising:
        said System Model, Attack/Countermeasures, Security Attribute Measurement, and said Vulnerability Matrix;
    said Security Evaluation Module comprising:
        said Security Score, and Acceptable Security Risk;
    wherein said Security Information Module and said System Information Module provide input to said Security Analysis Module, said Security Analysis Module providing input to said Security Evaluation Module.

14. A method for a system for security evaluation providing a quantitative methodology for calculating a relative risk of a system security architecture comprising:
    a Security Evaluation Framework comprising:
    providing a Security Report for said a system architecture;
    providing a Vendor Component Errata Report for said system architecture;
    providing security Design Guidance and expectations for said system architecture;
    providing a Bill of Materials for said system architecture;
    inputting said Security Report, said Vendor Component Errata Report, said security Design Guidance and expectations, and said Bill of Materials into a Parametric Data System Security Model;
    outputting a System Security View for said system architecture; and
    producing a Security Score relative risk report for said security evaluation of said system security architecture whereby said relative risk of said system security architecture is determined, wherein Data Elements of said Security Evaluation Framework comprise:
Common Elements; and
Security Engineering Specific Elements;
said Common Elements comprising:
Requirements;
fed by Use Cases;
Requirements comprising Sub-System Requirements;
said Requirements providing input to
a System Model, said System Model comprising a Sub-System Model; and
Material Lists;
said Security Engineering Specific Elements comprising:
a Hardware Model;
an Attack Model;
a Countermeasure Model;
a Vulnerability Matrix;
said Hardware Model, said Attack Model, and said Countermeasure Model providing input to said Vulnerability Matrix; and
a Security Score produced from said Vulnerability Matrix;
wherein said Sub-System Model and said Material Lists provide input to said Hardware Model.

15. The method of claim 14, wherein said Security Score comprises:
Security Score Parameters;
said Security Score Parameters comprising Security Score Scales; said Security Score Scales comprising:
Rank Scales with corresponding Descriptions of Investment and
Qualitative Scales with corresponding Descriptions of Effectiveness;
said Rank Scales comprising: numeric indicators one through ten;
said Rank Scale numeric indicators with corresponding Descriptions of Investment are:
10: Technology development required;
9: Significant financial investment and Significant execution duration;
8: Significant execution duration & Moderate financial investment;
7: Significant financial investment & Moderate execution duration;
6: Moderate execution duration & Moderate financial investment;
5: Significant execution duration & Low financial investment;
4: Moderate execution duration & Low financial investment;
3: Low execution duration & Significant financial investment;
2: Low execution duration & Moderate financial investment;
1: Widely publicized execution with common resources;
said Qualitative Scales comprising: High, Medium, and Low;
said Qualitative Scales with corresponding Descriptions of Effectiveness are:
High: Attack has a very high likelihood of causing permanent damage;
Medium: Attack is occasionally successful or likely to cause permanent damage in the process; and
Low: Attack is almost always successful.

16. The method of claim 14, wherein said Security Score Sensitive Information (CPI) changes over a product life cycle, steps of said product life cycle comprising, in order:
Milestone A (MSA);
Request for Proposal (RFP);
System Requirements Review (SRR);
Preliminary Design Review (PDR);
Milestone B (MSB);
Critical Design Review (CDR);
Milestone C (MSC);
Deployed;
Repair; and
End of Life (EOL).

17. The method of claim 16, wherein Security Risk Level Categories comprise:
Low Risk, wherein said Security Score is no more than 10% deficient;
Medium Risk, wherein said Security Score is greater than 10% but less than 75% deficient; and
High Risk, wherein said Security Score is 75% or more deficient;
wherein said Security Risk which is calculated as shortcoming deficiency of said Security Score for said System relative to a desired target security performance.

18. The method of claim 16, said steps of said product life cycle further comprising steps of:
Capability Insertion after said step of Deployed; and
Second Deploy before said step of Repair;
whereby new capability is added, and existing capability is modified.

19. A computer program product for calculating a relative risk of a system security architecture including one or more non-transitory machine-readable mediums encoded with instructions that, when executed, cause a process to be carried out, the process comprising:
inputting a Security Report for said a system security architecture, said system security architecture comprising Data Elements which comprise:
Common Elements; and
Security Engineering Specific Elements;
said Common Elements comprising:
Requirements;
fed by Use Cases;
Requirements comprising Sub-System Requirements;
said Requirements providing input to
a System Model, said System Model comprising a Sub-System Model; and
Material Lists;
said Security Engineering Specific Elements comprising:
a Hardware Model;
an Attack Model;
a Countermeasure Model;
a Vulnerability Matrix;
said Hardware Model, said Attack Model, and said Countermeasure Model providing input to said Vulnerability Matrix; and
a Security Score produced from said Vulnerability Matrix;
wherein said Sub-System Model and said Material Lists provide input to said Hardware Model;
inputting a Vendor Component Errata Report for said system architecture;
inputting security Design Guidance and expectations for said system architecture;

inputting a Bill of Materials for said system architecture;
inputting said Security Report, said Vendor Component Errata Report, said security Design Guidance and expectations, and said Bill of Materials into a Parametric Data System Security Model;
outputting a System Security View for said system architecture; and
producing a Security Score relative risk report for said security evaluation of said system security architecture whereby said relative risk of said system security architecture is determined.

* * * * *